(12) United States Patent
Smith et al.

(10) Patent No.: US 12,082,002 B2
(45) Date of Patent: *Sep. 3, 2024

(54) INTELLIGENT SELECTION OF OPERATING PARAMETERS FOR A WIRELESS ACCESS POINT

(71) Applicant: Comcast Cable Communications, LLC, Philadelphia, PA (US)

(72) Inventors: Todd Smith, Greenwood Village, CO (US); Dinesh Devotta, Cherry Hill, NJ (US); Christopher Albano, Medford, NJ (US); Eric Dreas, Highlands Ranch, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/789,358

(22) Filed: Jul. 1, 2015

(65) Prior Publication Data

US 2017/0006479 A1 Jan. 5, 2017

(51) Int. Cl.
*H04W 24/02* (2009.01)
*H04W 24/10* (2009.01)

(52) U.S. Cl.
CPC ............ *H04W 24/02* (2013.01); *H04W 24/10* (2013.01)

(58) Field of Classification Search
CPC .............................. H04W 24/02; H04W 24/10
USPC ........................................................ 370/252
See application file for complete search history.

(56) References Cited

U.S. PATENT DOCUMENTS

| 7,489,661 | B2 | 2/2009 | Hills et al. |
| 8,462,751 | B1* | 6/2013 | Dehghan ............. H04L 12/1485 370/338 |
| 8,824,442 | B2 | 9/2014 | Lea et al. |
| 9,179,346 | B1 | 11/2015 | Pawar et al. |
| 9,319,932 | B2* | 4/2016 | Yang ................. H04W 28/0289 |
| 2004/0047324 | A1* | 3/2004 | Diener ................. H04L 1/1664 370/338 |

(Continued)

FOREIGN PATENT DOCUMENTS

| CN | 101784073 A | 7/2010 |
| WO | 2014158131 A1 | 10/2014 |

OTHER PUBLICATIONS

Extended European Search Report—EP Application No. 1619395513—dated Mar. 8, 2017.

(Continued)

*Primary Examiner* — Gregory B Sefcheck
*Assistant Examiner* — Majid Esmaeilian
(74) *Attorney, Agent, or Firm* — Banner & Witcoff, Ltd.

(57) ABSTRACT

Aspects of the disclosure are directed toward intelligently selecting the operating parameters of wireless access points (WAPs) deployed in a wireless environment so as to minimize or at least reduce interference in that wireless environment. A WAP may continually measure characteristics of wireless channels used in the wireless environment and obtain measurements of channel metrics for those channels. The WAP analyzes the channel metric history to identify correlations between the channel metric measurements and various timeframes and selects one or more of its operating parameters based on the channel metric history and the correlations identified.

13 Claims, 11 Drawing Sheets

(56) References Cited

U.S. PATENT DOCUMENTS

| | | | |
|---|---|---|---|
| 2007/0168200 A1* | 7/2007 | Shimizu | G06Q 30/02 700/90 |
| 2007/0280332 A1 | 12/2007 | Srikanteswara et al. | |
| 2008/0069063 A1 | 3/2008 | Li et al. | |
| 2008/0281979 A1 | 11/2008 | Keeler | |
| 2010/0085907 A1* | 4/2010 | Yasumoto | H04W 88/04 370/315 |
| 2010/0177639 A1* | 7/2010 | Nam | H04W 72/082 370/237 |
| 2010/0246419 A1* | 9/2010 | Batta | G01S 11/06 370/252 |
| 2010/0250746 A1 | 9/2010 | Murase | |
| 2010/0296494 A1* | 11/2010 | Kanodia | H04W 8/04 370/336 |
| 2011/0088631 A1 | 4/2011 | Hsieh et al. | |
| 2011/0103242 A1* | 5/2011 | Hittel | H04W 24/08 370/252 |
| 2011/0111759 A1* | 5/2011 | Chami | H04W 48/20 455/436 |
| 2011/0250882 A1 | 10/2011 | Gao et al. | |
| 2011/0286401 A1 | 11/2011 | Wijting et al. | |
| 2012/0026882 A1 | 2/2012 | Park et al. | |
| 2012/0028664 A1 | 2/2012 | Zhang et al. | |
| 2012/0045012 A1 | 2/2012 | Alapuranen | |
| 2012/0122463 A1* | 5/2012 | Chen | H04W 72/082 455/450 |
| 2012/0254346 A1* | 10/2012 | Danforth | H04L 61/6022 709/217 |
| 2013/0142511 A1 | 6/2013 | Spraggs et al. | |
| 2013/0154822 A1 | 6/2013 | Kumar et al. | |
| 2013/0272285 A1 | 10/2013 | Goldsmith et al. | |
| 2013/0281143 A1* | 10/2013 | Nentwig | H04B 17/345 455/501 |
| 2014/0003380 A1 | 1/2014 | Han et al. | |
| 2014/0036691 A1 | 2/2014 | Madan et al. | |
| 2014/0036816 A1 | 2/2014 | Madan et al. | |
| 2014/0044054 A1 | 2/2014 | Kim et al. | |
| 2014/0071846 A1 | 3/2014 | Hintersteiner et al. | |
| 2014/0086168 A1 | 3/2014 | Bao et al. | |
| 2014/0092860 A1 | 4/2014 | Kneckt et al. | |
| 2014/0119316 A1 | 5/2014 | Linden et al. | |
| 2014/0233502 A1 | 8/2014 | Fong et al. | |
| 2014/0256329 A1 | 9/2014 | Cao et al. | |
| 2014/0314003 A1 | 10/2014 | Zhou et al. | |
| 2014/0323087 A1* | 10/2014 | Huang | H04W 48/20 455/411 |
| 2014/0349745 A1 | 11/2014 | Russo et al. | |
| 2014/0369242 A1 | 12/2014 | Ng et al. | |
| 2014/0376496 A1 | 12/2014 | Kozaki et al. | |
| 2015/0016353 A1 | 1/2015 | Lee | |
| 2015/0023202 A1 | 1/2015 | Shattil | |
| 2015/0029959 A1 | 1/2015 | Da et al. | |
| 2015/0043363 A1* | 2/2015 | Koskinen | H04W 16/14 370/252 |
| 2015/0055569 A1 | 2/2015 | Ju et al. | |
| 2015/0063323 A1 | 3/2015 | Sadek et al. | |
| 2015/0078346 A1 | 3/2015 | Farhadi et al. | |
| 2015/0103685 A1* | 4/2015 | Butchko | H04L 43/50 370/252 |
| 2015/0126207 A1 | 5/2015 | Li et al. | |
| 2015/0172305 A1* | 6/2015 | Dixon | G06F 21/53 726/23 |
| 2015/0189513 A1 | 7/2015 | Schmidt et al. | |
| 2015/0245364 A1 | 8/2015 | Yacovitch et al. | |
| 2015/0270882 A1 | 9/2015 | Shattil | |
| 2015/0271829 A1 | 9/2015 | Amini et al. | |
| 2015/0271837 A1 | 9/2015 | Larsson et al. | |
| 2015/0312900 A1 | 10/2015 | Pajukoski et al. | |
| 2015/0318965 A1 | 11/2015 | Sawai | |
| 2015/0350949 A1 | 12/2015 | Wang et al. | |
| 2015/0351026 A1 | 12/2015 | Lee et al. | |
| 2016/0219408 A1* | 7/2016 | Yang | H04W 52/0241 |

OTHER PUBLICATIONS

Dalal, Upena D., and Y. P. Kosta. "Adaptive Parameters Based Transmission Control and Optimization in Mobile WiMAX at Physical Layer." (2009).

Sridharan, M., et al. "NVGRE: Network virtualization using generic routing encapsulation." IETF draft (2011).

Nov. 29, 2016—(EP) Extended Search Report—App 16177542.4.

Dec. 19, 2017—European Office Action—EP 16177542.4.

\* cited by examiner

INTELLIGENT SELECTION OF OPERATING PARAMETERS FOR A WIRELESS ACCESS POINT

BACKGROUND

A current popular form of wireless computer networking technology is based on the IEEE 802.11 specification which uses the 2.4, 5, and 60 GHz ISM radio frequency bands—commercially known as "Wi-Fi." These radio frequency bands, however, are unlicensed thus permitting any device to operate within those radio frequency bands. As a result, devices that transmit and receive radio communications within these frequency bands are prone to interference from other devices operating at the same frequency or within the same radio frequency band. Examples of devices that can cause interference include other Wi-Fi devices, baby monitors, microwave ovens, short-range wireless communication devices, cordless phones, and the like.

With the growing popularity of devices with wireless communication capabilities, almost every home, school, office, and business includes at least one wireless access point (WAP) with some having multiple WAPs. In addition, municipalities and network service providers have begun to deploy publically available WAPs to provide wireless communication capabilities in public spaces such as parks, thoroughfares, and the like. As the number of WAPs deployed to a particular area increases, so does the re-use of the limited channels that are available in the unlicensed frequency bands. The re-use of channels often results in interference caused by multiple WAPs and their corresponding clients transmitting on the same channel concurrently. Such interference is only exacerbated as the number of devices (e.g., clients) connected to the WAP increases.

To mitigate interference, various techniques may be employed. One known technique is referred to as carrier sense multiple access with collision avoidance (CSMA/CA) in which devices attempt to avoid collisions by only transmitting when the channel appears to be idle. In CSMA/CA, a device listens on the channel to determine whether another devices is currently transmitting on that channel and, if so, waits a period of time before transmitting in order to allow the other device to complete its transmission. As the number of devices operating on that channel increases, however, delays may accumulate as devices wait for other devices to finish transmitting thus reducing the overall quality of service on the channel.

Given the unlicensed nature of the radio frequency bands, it is unlikely that all interference could be removed. In addition, attempts to mitigate interference on a channel may sacrifice the quality of service on the channel as noted above. Therefore channel selection can be another important factor in configuring a WAP operating in an unlicensed or other wireless environments. Current techniques for selecting an operating channel, however, for WAP have flaws. One current technique, for example, has the WAP scan each available channel for a short duration on power-up and selects the channel that appears to be the best. Channel characteristics, however, are not static and often change throughout the day. As a result, current channel selection techniques often do not take into account the dynamic nature of channel characteristics. Therefore, given that the density of public and private wireless environments is expected to only increase, improved techniques for configuring and operating WAPs are needed to ensure a high quality of service within crowded wireless environments.

SUMMARY

To overcome deficiencies and challenges, including but not limited to those identified above, means for configuring and operating wireless access points (WAPs) so as to minimize or at least reduce interference in a wireless environment are provided.

In some embodiments, a WAP deployed in a wireless environment continually measures the characteristics of the wireless channels used in the wireless environment. The WAP obtains measurements of one or more channel metrics associated with the channels measured. Channel metrics may include, for example, the number of other WAPs transmitting of the channel during the measurement period, a measurement of traffic on the channel, the bandwidth utilization of the channel, the noise on the channel, and the like. The WAP may obtain channel metric measurements for each channel of each radio frequency band it is configured to transmit on.

In some embodiments, the WAP stores the measurements obtained in a history of channel metric measurements. The WAP may also analyze the history of channel metric measurements to identify correlations between the channel metric measurements and various timeframes, e.g., times-of-day, days of the week, date ranges, and the like. Additionally or alternatively, the WAP may transmit the history of channel metric measurements to a centralized computing device (e.g., a server) that receives and stores multiple histories of channel metric measurements respectively received from multiple WAPs. That centralized server may likewise analyze the histories of channel metric measurements to identify correlations between the channel metric measurements and various parameters such as timeframes.

Based on the channel metric history obtained and the correlations identified, the WAP may select one or more operating parameters and reconfigure itself to utilize those selected operating parameters. Operating parameters include, for example, a particular radio frequency band and a particular channel to transmit on, a particular transmit power, and a particular wireless networking standard to utilize. The WAP may also select, based on the channel metric history obtained and correlations identified, a sequence of operating parameters for a sequence of timeframes, e.g., different operating parameters to use at various times throughout the day so as to avoid interference expected in the wireless environment during those timeframes. Additionally or alternatively, the centralized server may transmit to the WAP parameter selection instructions identifying one or more operating parameters to utilize. The centralized server may likewise transmit parameter selection instructions that include sequences of operating parameters to utilize at various times throughout the day.

In some embodiments, a device or entity such as a clearinghouse may also operate to coordinate operation parameters among the wireless access points deployed in the same wireless environment by different network service providers. A network service provider planning to deploy a new wireless access point in that wireless environment may request from the clearinghouse operating parameters for the new wireless access point. The clearinghouse may analyze the channel metric histories generated by the wireless access points deployed in that wireless environment and identify correlations between channel metric measurements and various parameters. The clearinghouse may thus select one or more operating parameters for the new wireless access point based on those channel metric histories and correlations.

This summary is not intended to identify critical or essential features of the disclosures herein, but instead merely summarizes certain features and variations thereof. Other details and features will also be described in the sections that follow.

BRIEF DESCRIPTION OF THE DRAWINGS

Some features herein are illustrated by way of example, and not by way of limitation, in the figures of the accompanying drawings and in which like reference numerals refer to similar elements.

DETAILED DESCRIPTION

Figure 1:
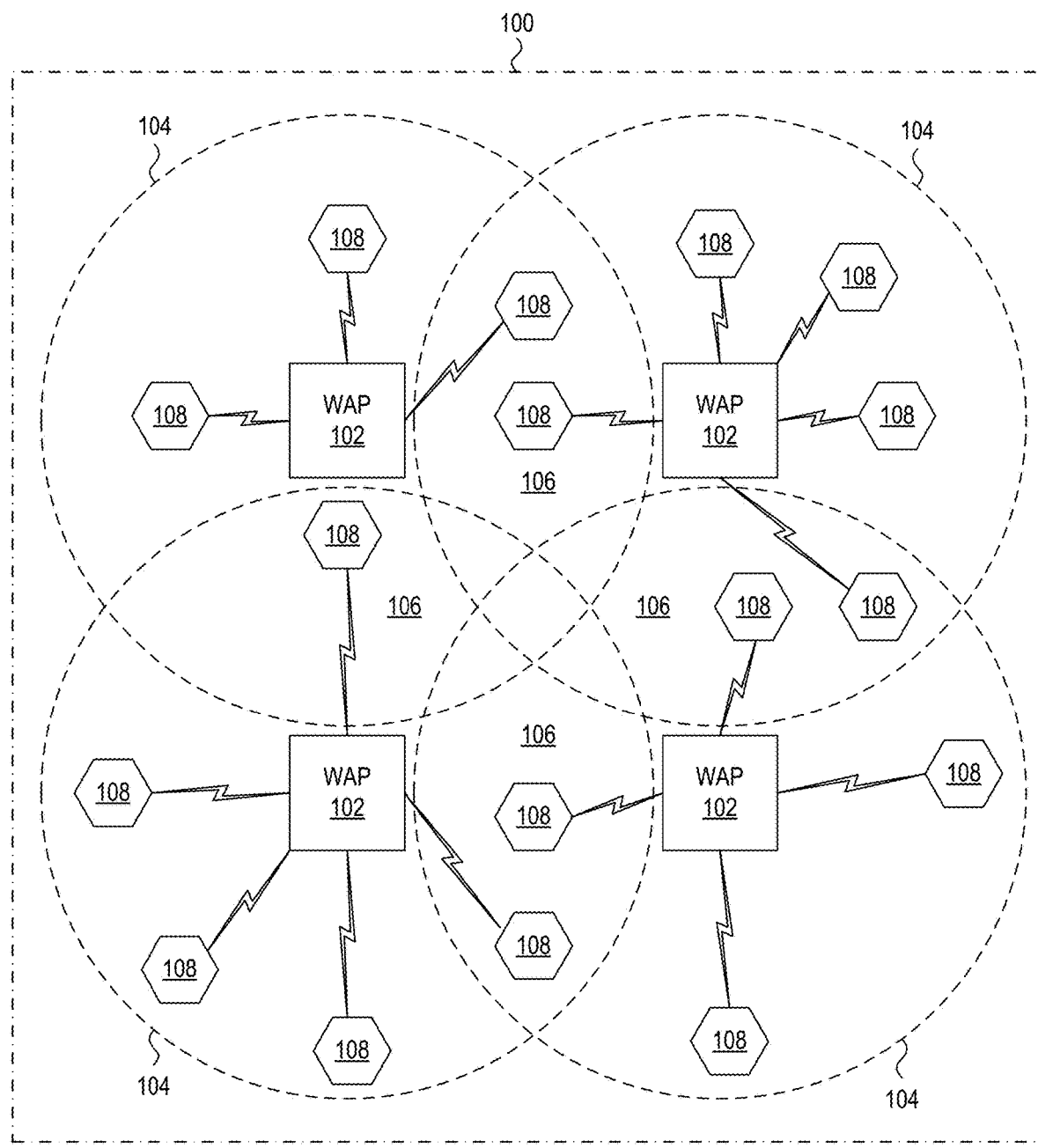
FIG. 1 illustrates an example wireless environment in which multiple wireless access points have been deployed in accordance with aspects described herein.

Aspects described herein relate to intelligently configuring wireless access points (WAPs) to mitigate interference from other devices operating within the same radio frequency band. The techniques described below are described, by way of example, in the context of the Wi-Fi family of wireless networking technologies—i.e., the IEEE the 802.11x family of wireless networking technologies. The techniques described below, however, may be employed with any wireless networking technology in which frequencies are shared among wireless devices.

As noted above, the techniques described below may be employed in wireless environments, such as where devices utilize the IEEE 802.11x family of wireless networking technologies which may operate in the 2.4, 5, and 60 GHz radio frequency bands ("Wi-Fi" and "WiGig") and in the 54-790 MHz frequency radio bands of the VHF and UHF white space spectrum ("Super Wi-Fi"). The techniques described below may also be employed in wireless environments where devices utilize the IEEE 802.16x family of wireless networking technologies ("WiMAX") which may operate in the 10-66 GHz radio frequency bands. Although the techniques described herein are referred to in the context of unlicensed frequency bands, it should be understood that such techniques may also be employed in wireless environments where devices utilize licensed frequency bands, e.g., the 3.6 GHz frequency band.

By way of example, a WAP may be configured to operate in the 2.4 GHz frequency band which extends between 2.4 GHz and 2.5 GHz and may be divided into fourteen total channels spaced 5 MHz apart and numbered from channel 1 to channel 14. The WAP may thus be configured to utilize one of those channels as its operating channel. Due to regulations, one or more of the channels may not be available in some jurisdictions. Other frequency bands may be similarly divided into multiple channels.

To mitigate the effects of interference in a wireless environment in which multiple WAPs are deployed, techniques may utilize historic measurements of channel metrics to select operating parameters for the WAPs. As described in further detail below, a WAP continually measures the characteristics of the wireless channels used in the surrounding wireless environment. The WAP stores the measurements, internally or at an associated memory, obtained to build a channel metric history and analyzes that channel metric history to identify correlations in channel usage (e.g., patterns and/or trends). Based on the analysis of the channel metric history, the WAP is thus equipped to make intelligent decisions with respect to the channel, frequency band, and/or other operating parameters it utilizes to exchange wireless communications with downstream and upstream devices.

As a practical example, in a mixed-use building that includes both residences and office space, the WAPs of the residents may potentially interfere with the WAPs of the businesses and vice versa. By continually measuring the characteristics of the wireless channels, however, correlations may be identified with respect to channel usage relative to the time-of-day. Channels typically used by the residential WAPs may exhibit relatively higher usage in the morning as residents are getting ready for work as well as later in the evening when the residents return home from work. Channels typically used by the office WAPs, however, may exhibit relatively higher usage during the work day. Analyses of the channel metric histories obtained may reveal these trends and thus be utilized to intelligently configure the WAPs to mitigate interference. The residential WAPs may utilize the channel metric histories to identify which channels exhibit a relatively higher usage during the work day and thus select a different channel as its operating channel to avoid interference with the office WAPs during the workday. Later in the evening, however, the residential WAP may switch its operating channel to one of the channels utilized by the office WAPs which the channel metric history has shown to exhibit relatively low channel usage after work hours. The analysis of the channel metric history may also reveal patterns and/or trends with respect to other residential WAPs nearby which may exhibit relatively high channel usage before and after work hours.

As another practical example, a municipality or network service provider may deploy multiple WAPs to provide wireless networking capabilities across an entire geographic area such as a public park. To ensure blanket coverage, WAPs may be deployed such that their wireless range overlaps (e.g., transmission and reception range). Since overlapping wireless ranges introduces the potential for interference, however, the WAPs may again continually measure the characteristics of the wireless channels used in the geographic area and build respective channel metric histories. Those channel metric histories may again be analyzed to identify patterns and/or trends in channel usage within the public area, e.g., that channel usage is relatively higher during lunch hours, during the evening, and on weekends. Based on these patterns and/or trends, the WAPs may select their respective operating parameters (e.g., operating channel) to mitigate interference, e.g., neighboring WAPs having overlapping wireless ranges may each respectively select non-overlapping channels. As described in further detail below, the WAPs deployed by a particular network service provider may each be connected to a centralized WAP control server and transmit their respective channel metric histories to the WAP control server for storage and analysis. The WAP control server may then issue instructions to a WAP identifying one or more operating parameters to use, e.g., a particular channel to set as the operating channel.

Additional examples will be appreciated with the benefit of this disclosure.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging. In addition a "set" as used in this description refers to a collection of one or more elements. Furthermore non-transitory computer-readable media refer to all types of computer-readable media with the sole exception being a transitory propagating signal.

Referring now to FIG. 1, an example wireless environment 100 in which multiple wireless access points (WAPs) 102 have been deployed is shown. As noted above, the wireless environment 100 may be a public or private space. As seen in FIG. 1, some WAPs 102 may be associated with a corresponding wireless range 104 that overlaps with the wireless range of at least one other one of the WAPs resulting in various regions 106 of overlapping wireless ranges. The WAPs 102, in this example, are configured to, at boot time, scan the wireless environment and select the best available channel. Since the radio frequencies in the wireless environment continuously change due to the presence of neighboring WAPs and other types of wireless devices (e.g., microwaves, cordless phones, etc.), the WAPs 102, in this example, are also configured with a dynamic channel selection feature that iteratively scans the wireless environment on one or more of the available channels and maintain a history of channel metric measurements obtained during those scans. A WAP 102 may thus modify its operating parameters (e.g., its operating channel) if it determines a better channel is available based on the history of channel metric measurements. Devices 108, such as user devices, client devices, or any device that uses the WAP 102 may be located within the wireless environment 100 and in signal communication with one of the WAPs 102. The WAPs 102 may provide the devices 108 with network access, e.g., access to a local area network (LAN), a wide area network (WAN) such as the Internet, and/or a content delivery network.

The devices 108 may be any type of computing device configured for wireless networking Examples of such devices include desktop computing devices, laptop computing devices, tablet computing devices, hand-held computing devices, servers, gateways, data storage devices, mobile cellular telephones, video game machines, televisions, set-top boxes, in-vehicle devices (e.g., vehicle monitoring devices, navigation devices, point-of-interest devices), wearable computing devices (e.g., watches, retinal displays, head-mounted displays), robots, "smart" devices and appliances, and network-enabled objects that form part of the "Internet of Things."

As also seen in FIG. 1, various devices 108 are located within the regions 106 of overlapping wireless ranges and in wireless signal communication with different WAPs. If the WAPs 102 operate on the same channel, then interference may degrade the wireless signals exchanged between those WAPs and their respective devices 108. Intelligently selecting which channels the WAPs 102 respectively utilize, however, advantageously mitigates interference and thus mitigates degradation of the wireless signals exchanged. By mitigating interference and mitigating degradation of the wireless signals, aspects of the wireless communications exchanged between the WAPs 102 and devices 108 are advantageously improved, e.g., lower latency, higher throughput, less packet loss, fewer collisions.

In some scenarios, each of the WAPs 102 may be deployed by the same entity, e.g., the same service provider such as a network service provider and/or content service provider. In these scenarios the service provider may control the configuration of the WAPs 102 to minimize interference between neighboring WAPs. Given the unlicensed nature of some wireless communication technologies, however, it will be recognized that other service providers may deploy their own WAPs 102 within the wireless environment 100 thus introducing potential sources of interference. Since a service provider is unlikely to have control over the WAPs deployed by another service provider, other strategies are needed to minimize, or at least mitigate, those potential sources of interference. The techniques for intelligent selection of WAP operating parameters described herein may be implemented to that effect.

In some example implementations, the dynamic channel selection feature may be activatable and deactivatable at the WAP 102. In some example implementations, the default state of the dynamic channel selection feature may be the deactivated state. Various techniques may be employed to activate and deactivate the dynamic channel selection including, e.g., a boot file stored at the WAP 102 or using a Simple Network Management Protocol (SNMP) object identifier (OID). A WAP 102 may also be configured to activate or deactivate the dynamic channel selection feature in response to receipt of an instruction, e.g., an instruction received at the WAP from a service provider via a service provider network.

Figure 2A:
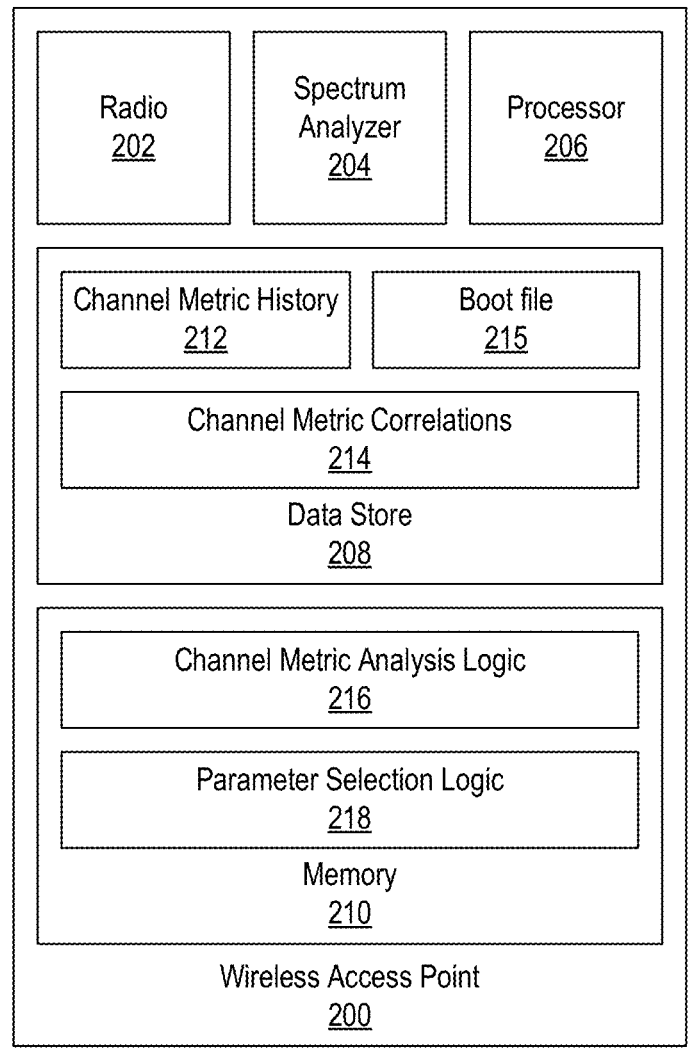
FIG. 2A illustrates a block diagram of an example of an implementation of a wireless access point in accordance with aspects described herein.

Referring now to FIG. 2A, a block diagram of an example of an implementation of a wireless access point (WAP) 200 configured for intelligent selection of WAP operating parameters is shown. The WAP 200, in this example, is configured to measure the characteristics of the wireless channels utilized in its surrounding wireless environment, store channel metric measurements as a channel metric history, analyze the channel metric history to identify correlations between the metrics measured and various timeframes, and select one or more operating parameters based on those correlations.

The WAP 200, in this example, includes a radio 202, a spectrum analyzer 204, a processor 206, a data store 208, and memory 210. The data store 208 stores the channel metric history 212 corresponding to a set of channel metric measurements obtained by the spectrum analyzer 204 and stores the channel metric correlations 214 identified from the analysis of the channel metric history. The WAP 200 is programmed with instructions that, when executed by the processor 206, cause the WAP 200 to perform various actions associated with intelligent selection of WAP operating parameters. Accordingly, the memory 210 stores channel metric analysis logic 216 corresponding to a set of instructions for analyzing the channel metric history 212 and stores parameter selection logic 218 corresponding to a set of instructions for selecting a value for one or more operating parameters of the WAP 200 based on the analysis of the channel metric history 212.

The radio 202 may include a corresponding receiver, transmitter, and antenna. In some example implementations, the radio 202 may include multiple antennas for sending and receiving multiple data streams simultaneously, e.g., in multiple-input multiple-output (MIMO) implementation. The radio 202 may be configured to operate within a particular radio frequency band, e.g., the 2.4 GHz radio frequency band or the 5 GHz frequency band. Although only one radio 202 is shown in FIG. 2A, the WAP 200 as well as other implementations of the WAP may include multiple radios, e.g., at least one 2.4 GHz radio and at least one 5 GHz radio. Similarly the WAP 200 and other implementations of the WAP may include multiple processors 206.

The spectrum analyzer 204, in this example, periodically measures the wireless environment surrounding the WAP 200 to collect channel metric measurements of the wireless channels being utilized in the wireless environment. During a measurement period, the spectrum analyzer 204 collects data related to one or more channel metrics. Example channel metrics include the number of devices operating on the channel, the number of other WAPs operating on the channel, a measurement of traffic on the channel, the number of packets transmitted on the channel, bandwidth utilization of the channel, signal strength (e.g., in dBm) of the wireless signals transmitted on the channel, noise level in the wireless environment, signal-to-noise ratio (SNR), a received signal strength indicator (RSSI), a received channel power indicator (RCPI), the transmit opportunity on the channel, packet error rates on the channel, noise floor, and the like. In some example implementations, an overall channel quality metric may be calculated for a channel based on a combination of channel metric measurements obtained for that channel. The overall channel quality metric may be a numeric metric that rates the quality of the channel on a numeric scale (e.g., 1-10) or according to some other non-numeric scale.

During each measurement period the spectrum analyzer adds the channel metric measurements obtained to the channel metric history 212 stored at the data store 208 (or to external storage, e.g., at an external data store). The spectrum analyzer 204 also indicates the date and time each channel metric measurement was obtained. Accordingly the channel metric history 212 includes at least, for each channel measured, an identifier for the channel that was measured, the values of the channel metric measurements obtained for the channel, and the date and time of the measurement. In this way, the channel metric analysis logic 216 may identify correlations between channel use and various timeframes, e.g., timeframes throughout the day, days of the week, and date ranges.

The spectrum analyzer 204 may also be configured, in some example implementations, to scan the wireless environment at predetermined regular intervals (e.g., every fifteen minutes). The spectrum analyzer 204 may further be configured, in some example implementations, to scan a channel for a predetermined duration, and the duration of the scan may differ depending on whether the scan occurs at boot up or during one of the iterative measurement periods. At boot up, for example, the duration of the scan may be between around 500 milliseconds (ms) to around 1000 ms and in some example implementations be 500 ms. During one of the iterative measurement periods, however, the during of the scan may be between around 50 ms to around 100 ms and in some example implementations be 50 ms. The scan interval as well as the scan durations may likewise be configurable at the WAP 200, e.g., via a boot file and/or SNMP OIDs. These parameters may be configurable parameters at the WAP, and the values for the parameters may be set using, e.g., a boot file 215 stored at the data store 208 and/or SNMP OIDs.

The channel metric analysis logic 216 may store the correlations identified at the data store 208 as the channel metric correlations 214. The channel metric correlations 214 identified may include both linear and non-linear correlations between the various channel metrics measured and various timeframes, and a metric may be positively or negatively correlated with a particular timeframe. The channel metric correlations 214 identified may also include correlations where there is no statistically significant relationship between the metric and the timeframe, e.g., a channel metric correlation may indicate that there is no appreciable correlation. Analyzing the channel metric measurements may include obtaining an average of the channel metric measurements obtained during a particular timeframe and comparing that average to a channel metric measurement threshold or an average of channel metric measurements obtained for another timeframe. As one example, analyzing the channel metric measurements may include determining whether an average channel metric measurement for a previous timeframe crossed a metric measurement threshold—e.g., whether an average number of WAPs transmitting on a channel during a previous time period exceeded ten total WAPs or was less than 3 total WAPs. An another example, analyzing the channel metric measurements may include comparing averages of channel metric measurements for respective timeframes differ by more than a predetermined amount—e.g., whether the average number of WAPs transmitting on a channel between 4:30 AM-8:30 AM differs from the average number of WAPs transmitting on that channel between 8:30 AM-5:30 PM by more than five total WAPs.

The spectrum analyzer 204 measures the wireless environment surrounding the WAP 200 and thus continually updates the channel metric history 212. In some example embodiments, the spectrum analyzer 204 measures the wireless environment continually during operation of the WAP 200, e.g., intermittently, periodically, or at regular or irregular intervals. The spectrum analyzer 204 may also measure the wireless environment in response to receipt of an instruction from another component of the WAP 200 or from another computing device in wired or wireless signal communication with the WAP located either locally or remotely relative to the WAP. The channel metric analysis logic 216, in turn, analyzes the new channel metric measurements obtained and updates (or replaces) the channel metric correlations 214 based on the analyses of the new channel metric measurements. The spectrum analyzer 204 may measure the wireless environment surrounding the WAP 200 at regular intervals, e.g., every 15 minutes. The channel metric selection logic 216 may perform an analysis of the channel metric history 212 after each measurement period or at a different regular interval, e.g., once a day. The spectrum analyzer 204 may also measure each channel of each frequency band the WAP 200 is capable of transmitting on. As an example, if a WAP includes a 2.4 GHz radio and a 5 GHz radio, then the spectrum analyzer for that WAP may measure each channel in the 2.4 GHz radio frequency band as well as each channel in the 5 GHz radio frequency band during each measurement period. If storage space is limited at the data store 208, channel metric measurements more than x days old (e.g., 7 days) may be deleted to free up storage space for new channel metric measurements. This continual process of measuring the wireless environment surrounding the WAP 200, updating the channel metric history 212, and update the channel metric correlations 214 advantageously allows the WAP to adapt to changes in the patterns and trends of channel use in the surrounding wireless environment.

The parameter selection logic 218, in this example, selects values for one or more operating parameters of the WAP 200 based on the channel metric correlations 214 identified. The primary operating parameter selected for the WAP 200 based on the channel metric correlations 214 is the operating channel of the WAP. Accordingly the parameter selection logic 218 determines whether there is a better channel to utilize as the operating channel based on the channel metric correlations and, if so, instructs the WAP 200 to switch its operating channel to the new channel selected. The parameter selection logic 218 may determine whether to switch to a different channel, e.g., whenever the channel metric correlations 214 are updated or at a regular interval (e.g., half-hour).

The parameter selection logic 218 may also determine to switch to a different channel in response to determining that a channel measurement metric obtained for its current operating channel has crossed a metric measurement threshold (i.e., dropped below the metric measurement threshold or exceeded the measurement metric threshold). The parameter selection logic 218 may also determine whether to switch to a different channel based on a comparison of multiple channel metric measurements to respective metric measurement thresholds.

The operating channel, however, is not the only operating parameter that may be selected based on the channel metric correlations 214 in order to improve the performance of the WAP in the surrounding wireless environment. Other operating parameters that may be selected based on the channel metric correlations 214 include the radio frequency band utilized by the WAP, the wireless networking standard utilized by the WAP, and the transmit power of the WAP. As an example, the WAP 200 may switch from the 2.4 GHz radio frequency band to the 5 GHz radio frequency band based on the channel metric correlations 214 identified. An another example, the WAP 200 may switch from the 802.11b wireless networking standard to the 802.11g wireless networking standard based on the channel metric correlations 214 identified.

In addition, an activation status of a WAP may be toggled based on channel metric correlations. As an example, one or more inactive WAPs deployed in a wireless environment may be activated and deactivate based on channel metric correlations that indicate relatively more or less demand for wireless services at various times in a wireless environment. As an example, the channel metric correlations may indicate that demand for wireless services decreases in the geographic region during the evening and nighttime hours and increases in the geographic region during the morning and daytime hours. Accordingly, one or more WAPs may deactivate around the time the channel metric correlations indicate demand for wireless services is expected to decrease, and one or more WAPs may activate around the time the channel metric correlations indicate demand for wireless services is expected to increase. A WAP itself may determine whether to activate or deactivate based on the channel metric correlations or, additionally or alternatively, a WAP may receive an instruction to activate or deactivate from a centralized control server. Furthermore, a WAP may generate or receive a sequence of timeframes during which the WAP is active or inactive (e.g., active from 6:00 AM to 11:59 PM and inactive from 12:00 AM to 5:59 AM) and thus activate and deactivate accordingly.

Furthermore the parameter selection logic 218 may select a sequence of operating parameters for a sequence of consecutive timeframes based on the channel metric correlations identified. A timeframe may be defined by one or more of a time-of-day (e.g., between 5:30 AM and 7:30 AM), a day of the week (e.g., Saturday and Sunday), and a date range (e.g., between May 22 and August 27). In this way the parameter selection logic 218 may preemptively change the operating parameters of the WAP 200 based on the channel metric correlations 214 identified. The parameter selection logic 218 may change an operating parameter prior to a subsequent timeframe, at the start of the subsequent timeframe, or during the subsequent timeframe. In some example implementations, even though the channel metric correlations 214 indicate the WAP 200 could be using a better operating channel, the parameter selection logic 218 may not change an operating parameter of the WAP unless a channel metric measurement for its current operating channel has crossed a metric measurement threshold. In these example implementations, the WAP 200 advantageously avoids unnecessary reconfigurations of its operating parameters and thus unnecessary disruptions to the wireless services provided to its devices.

Figure 2B:
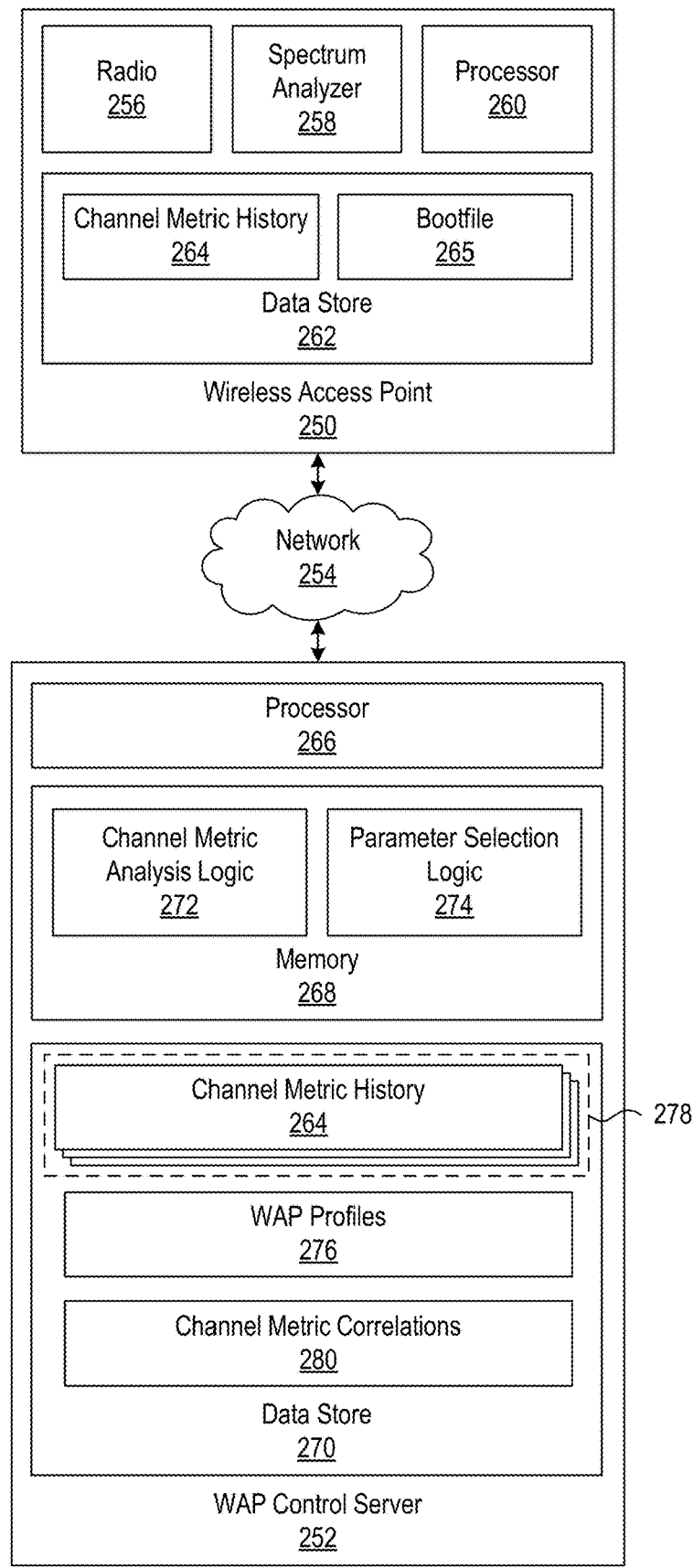
FIG. 2B illustrates a block diagram of another example of an implementation of a wireless access point and an example of an implementation of a wireless access point control server in accordance with aspects described herein.

Referring now to FIG. 2B, a block diagram of another example of an implementation of a wireless access point (WAP) 250 configured for intelligent selection of WAP operating parameters is shown. Like the WAP 200 discussed above with reference to FIG. 2A, the WAP 250 in FIG. 2B is configured to measure the characteristics of the wireless channels utilized in its surrounding wireless environment and to store channel metric measurements as a channel metric history. In contrast to the WAP 200 of FIG. 2A, the WAP 250 of FIG. 2B does not analyze the channel metric history to identify channel metric correlations and select an operating parameter based on those correlations. Instead the WAP 250 is in signal communication with a WAP control server 252 via a network 254 and transmits its channel metric history to the WAP control server. The WAP control server 252 may be in signal communication with multiple WAPs via the network 254 and may thus coordinate the configuration of those WAPs to minimize interference between those WAPs. Based on the connection of the WAP control server 252 to the WAP 250 via the network 254, the WAP control server may be described as located remotely relative to the WAP.

The WAP control server 252 may be maintained by a service provider (e.g., a network service provider) that has deployed those WAPs throughout a geographic area in order to provide wireless networking capabilities across that geographic area. In some implementations, the WAP control server 252 may be in signal communication with dozens, hundreds, thousands, or even millions of WAPs deployed across one or more geographic areas. A service provider may also maintain a WAP control server 252 for each geographic area in which WAPs have been deployed such that each WAP control server manages the configuration of the WAPs deployed in its respective geographic region. A geographic region may be defined in various way including coordinates of a geographic coordinate system (e.g., latitude/longitude), street boundaries (e.g., northern, southern, eastern, and western streets), zip code boundaries, municipal boundaries (e.g., county/city/state boundaries), and the like. These techniques may be similarly employed for other types of regions and/or areas that are smaller in scale that geographic regions, e.g., office building, commercial buildings, residential buildings, and the like.

Like the WAP 200 of FIG. 2A, the WAP 250 shown by way of example in FIG. 2B includes a radio 256, a spectrum analyzer 258, a processor 260, and a data store 262. The radio 256, the spectrum analyzer 258, and the processor 260 may be, respectively, the same as or at least similar to the radio 202, the spectrum analyzer 204, and the processor 206 described above with reference to FIG. 2A. In some example implementations of the WAP 250, the radio 256 may include multiple antennas, and the WAP may include multiple radios. The WAP 250 may also include multiple processors 260 in some example implementations.

The spectrum analyzer 258 likewise periodically measures the wireless environment surrounding the WAP 250 to collect channel metric measurements of the wireless channels being utilized in the wireless environment. The spectrum analyzer 258 also adds the channel metric measurements obtained to a channel metric history 264 stored at the data store 262 of the WAP 250. The spectrum analyzer 258 may collect one or more of the same type of channel metrics discussed above. As also seen in FIG. 2A, the data store 262 also stores a boot file 265 which may include various configurable parameters that control operation of the WAP 250.

The WAP control server 252 is a special-purpose computing device programmed with instructions for receiving the channel metric histories from multiple WAPs, analyzing those channel metric histories to identify correlations with respect to channel metrics, and selecting one or more operating parameters for one or more of the WAPs in signal communication with the WAP control server. Accordingly, the WAP control server 252, in this example, includes a processor 266, memory 268, and a data store 270. The memory 268 stores channel metric analysis logic 272 and parameter selection logic 274. The data store 270 stores WAP profiles 276 for each WAP the WAP control server 252 is in signal communication with, a set 278 of individual channel metric histories 264 received from various WAPs such as WAP 250, and channel metric correlations 280 identified from an analysis of the channel metric histories 264.

Each WAP profile 276 is associated with one of the WAPs in signal communication with the WAP control server 252, e.g., WAP 250. A WAP profile 276 may include, for example, a unique identifier for the WAP (e.g., a MAC address of the WAP) and a location identifier indicating the location (or geographic region) in which the WAP is deployed. In addition, a WAP profile 276 may identify a date and time at which the WAP control server 252 most recently received a channel metric history from the WAP associated with that WAP profile. In some example implementations, a WAP profile 276 may identify the other WAPs within wireless range of the WAP. In other example implementations, the WAP control server 252 may identify the WAPs in wireless range of each other based on the respective location identifiers of the WAP profiles 276. In this way, the WAP control server 252 may coordinate the configuration of the WAPs that are in signal communication with each other. Each channel metric history 264 may be associated with one of the WAP profiles, e.g., by also including the unique identifier of the WAP that generated the channel metric history.

The channel metric analysis logic 272 in FIG. 2B is similar to the channel metric analysis logic 216 of FIG. 2A in that it identifies correlations with respect to channel metrics. The channel metric analysis logic 272, however, may identify correlations with respect to channel metrics based on an analysis of multiple channel metric histories 264. As an example, the channel metric analysis logic 272 may analyze multiple channel metric histories 264 that are each associated with a common geographic region and identify one or more correlations for that geographic region. Accordingly, each channel metric correlation 280 may identify the particular geographic region the channel metric correlation has been identified for. The channel metric correlations 280 may likewise identify a correlation between a channel metric and a timeframe.

The parameter selection logic 274 in FIG. 2B is likewise similar to the parameter selection logic 218 of FIG. 2A in that it selects a value for one or more operating parameters of a WAP such as WAP 250. The parameter selection logic 274, however, may select values for the operating parameters of multiple WAPs and coordinate those selections for WAPs within the same geographic region. The parameter selection logic 274 may similarly select a value for an operating parameter of a WAP for a single timeframe or a sequence of operating parameter values for a sequence of consecutive timeframes. The parameter selection logic 274 may also similarly select values for multiple operating parameters, e.g., an operating channel, a radio frequency band, and a wireless networking standard. Having selected values for one or more operating parameters of the WAP 250, the WAP control server 252 may issue to that WAP instructions having the selected values.

Figure 3:
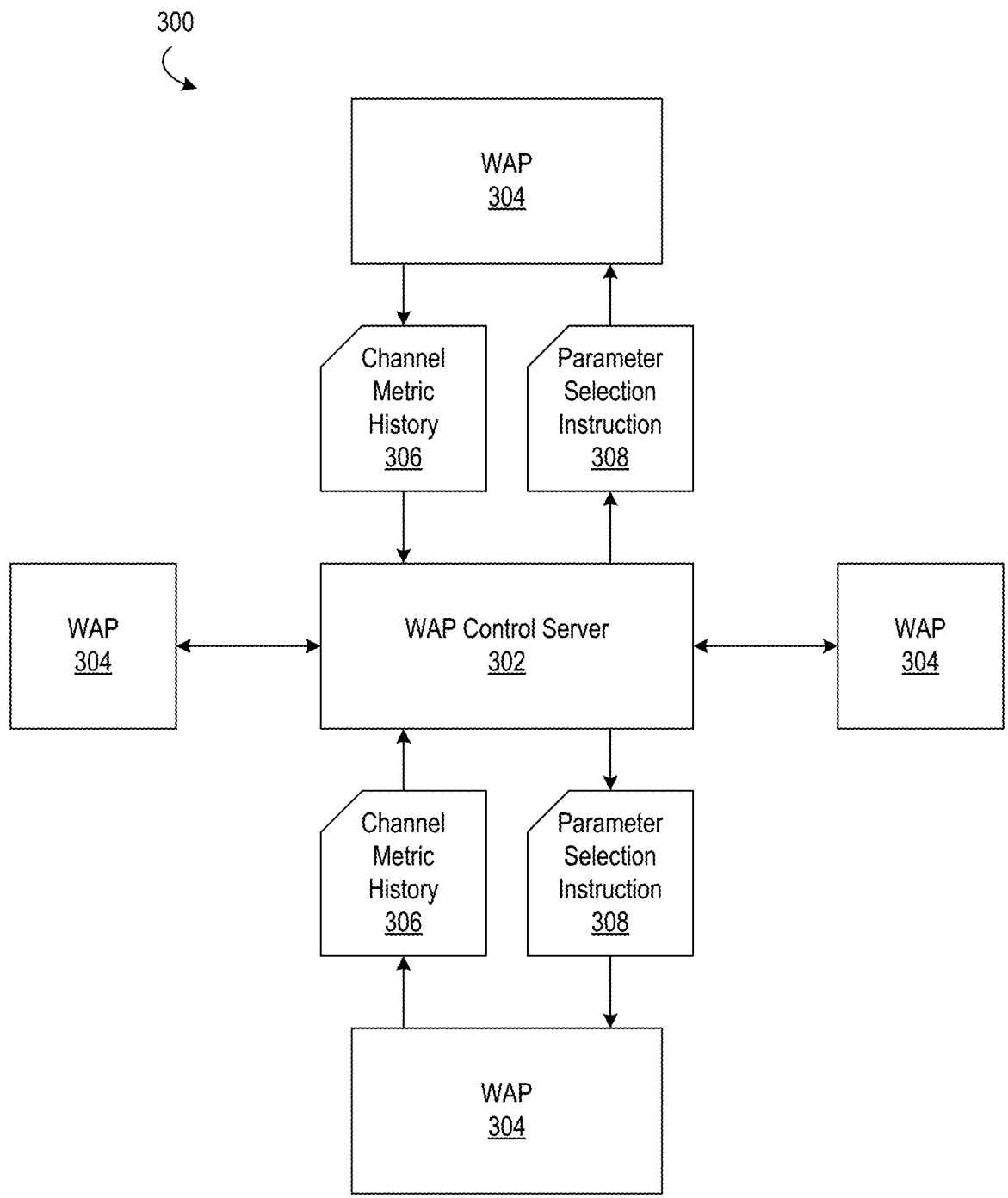
FIG. 3 illustrates an example of an implementation of a system in which multiple wireless access points are in signal communication with a wireless access point control server in accordance with aspects described herein.

FIG. 3 illustrates a block diagram of a system 300 in which a WAP control server 302 is in signal communication with multiple WAPs 304 and manages the configuration of those WAPs. The WAP control server 302 may be the same type of computing device as or at least similar to the WAP control server 352 discussed above with reference to FIG. 2B. The WAPs 304 may be the same as or at least similar to the WAP 200 or the WAP 250 also discussed above with reference to FIG. 2A and FIG. 2B respectively.

As seen in FIG. 3, a WAP 304 transmits a channel metric history 306 to the WAP control server 302 which stores the channel metric history at a data store in response. In some example implementations, the WAP 304 may delete the channel metric history 306 after transmitting it to the WAP control server 302 in order to free up storage space for a subsequent channel metric history generated by the WAP. A WAP 304 may transmit a channel metric history 306 to the WAP control server 302 each time the channel metric history is updated with new channel metric measurements or at regular intervals (e.g., every hour, once a day).

As also seen in FIG. 3, the WAP control server 302 transmits a parameter selection instruction 308 to a WAP 304. The parameter selection instruction 308 identifies an operating parameter of the WAP 304 and specifies a value for that operating parameter. As described above, the value specified for the operating parameter is based on the channel metric correlations identified. In response to receipt of the parameter selection instruction 308, the WAP 304 sets the identified operating parameter to the value specified. The WAP control server 302 may transmit the parameter selection instruction 308 in response to determining that a better channel is available within the wireless environment surrounding a WAP 304, in response to determining that a channel metric measurement received from a WAP has crossed a metric measurement threshold, in response to obtaining new channel metric correlations, or at regular intervals (e.g., every hour, once a day). The parameter selection instruction 308 may identify multiple operating parameters (e.g., radio frequency band, channel, and wireless networking standard) and specify a value for each operating parameter identified. In addition, the parameter selection instruction 308 may identify a sequence of values for an operating parameter and a corresponding sequence of timeframes in which a WAP 304 should set those operating parameters.

Figure 4:
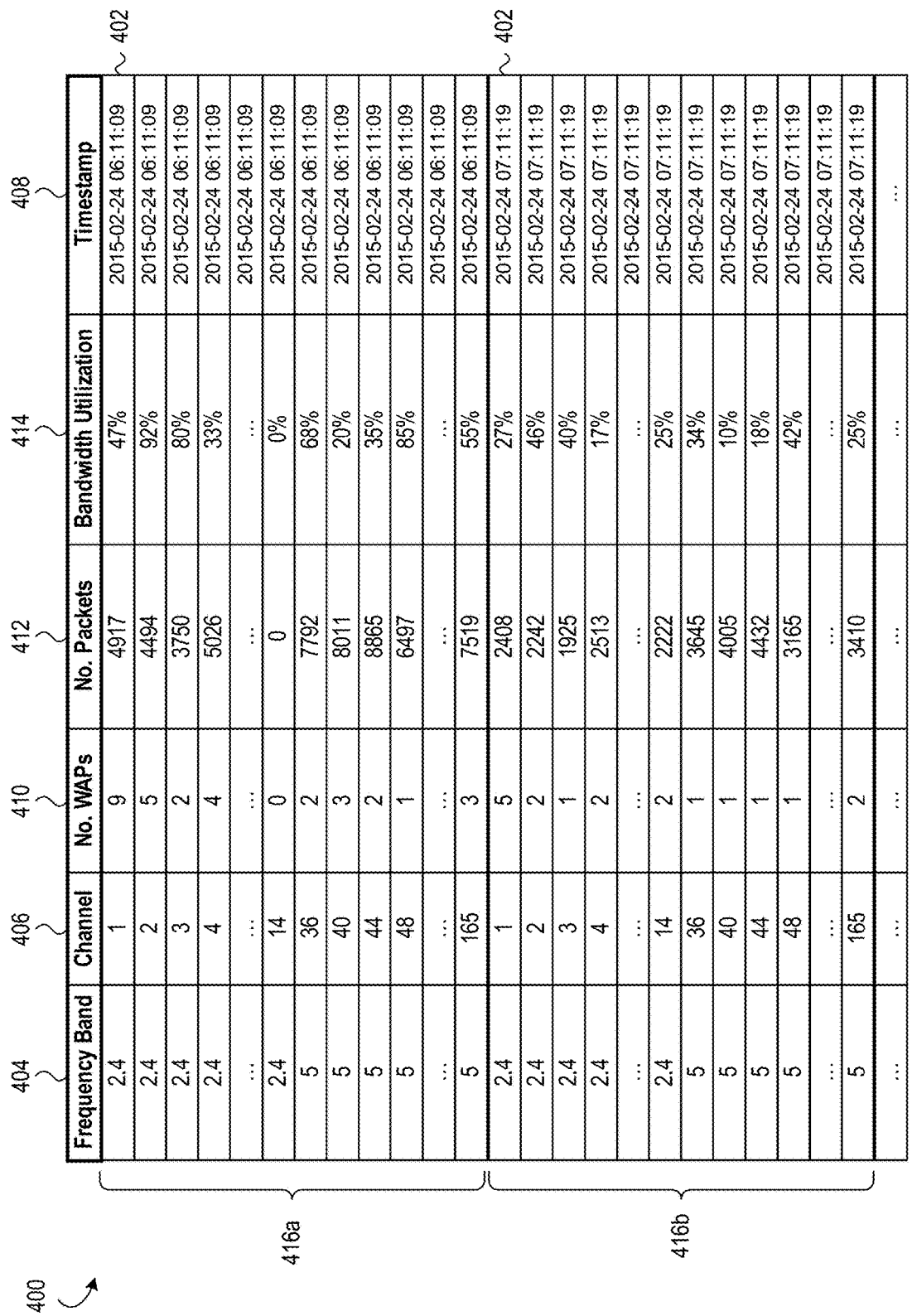
FIG. 4 illustrates an example of an implementation of a channel metric measurement history in accordance with aspects described herein.

Referring now to FIG. 4, an example of an implementation of a channel metric history 400 is shown. The channel metric history 400, in this example, is configured as a table in which each row of the table corresponds to a channel metric measurement record 402 and in which the columns of the data correspond to the data elements of the channel metric measurement records 402. For clarity not all of the channel metric measurement records 402 have been labeled in FIG. 4.

The data elements of the channel metric measurement records 402, in this example, include a frequency band data element 404, a channel data element 406, and a timestamp data element 408. A channel metric measurement record also includes a data element corresponding to the channel metric measurement obtained by the WAP. As noted above, a WAP may measure one or more types of channel metrics and store the channel metric measurements obtained in the channel metric history. Accordingly a channel metric measurement record may include data elements for each channel metric measurement obtained as well as data elements for channel metrics derived from the channel metric measurements obtained (e.g., an overall channel quality metric). The channel metric history 400 shown by way of example in FIG. 4 includes a first channel metric data element 410 corresponding to the total number of other WAPs that were observed to be utilizing the channel during the measurement period, a second channel metric data element 412 corresponding to the total number of packets transmitted on the channel during the measurement period, and a third channel metric data element 414 corresponding to the bandwidth utilization percentage on the channel. It will be recognized that the channel metrics shown in the channel metric history 400 of FIG. 4 are shown by way of example only. Other channel metric histories may include data elements corresponding to additional or alternative channel metrics. For example, a channel metric history may also indicate the number of devices currently utilizing the WAP that obtains the channel metric measurements as well as the number of client devices respectively utilizing those WAPs. As a specific example, a channel metric history may include one or more data elements to uniquely identify (e.g., via SSID) each WAP operating on a particular channel, and, for each one of those WAPs, the number of devices communicating with that WAP on that channel. Such information may look like, e.g., {SSID: A, No. Devices: 1; SSID: B, No. Devices: 3; SSID: C; No. Devices: 5, . . . }.

As noted above, a WAP may obtain, during a measurement period, channel metric measurements for each channel of each frequency band the WAP is capable of transmitting on. By way of example, the WAP that generated the channel metric history 400 of FIG. 4 is capable of transmitting on the 2.4 GHz and the 5 GHz radio frequency bands, and the channel metric history thus includes channel metric measurement records 402 for each channel of those frequency bands. For clarity, channel metric measurement records for some of the channels in the 2.4 GHz and the 5 GHz radio frequency bands have been omitted in FIG. 4. A WAP may thus generate a set of multiple channel metric measurement records for each measurement period. In some example implementations, measurement periods may be uniquely identified via a numeric identifier that sequentially increments for each measurement period. Although omitted from FIG. 4, channel metric measurement records 402 may also include a data element corresponding to the measurement period in which the channel metric measurements were obtained. In this way, the set of channel metric measurement records generated during a particular measurement period may be grouped together. By way of example, FIG. 4 depicts for the channel metric history 400 a first set of channel metric measurements 416a obtained during a first measurement period and a second set of channel metric measurements 416b obtained during a second measurement period. A WAP may update the channel metric history 400 whenever new channel metric measurements are obtained during a new measurement period, e.g., append new channel metric measurement records 402 to the channel metric history. Finally, it should be appreciated that the values indicated in the various channel metric measurement records 402 of FIG. 4 are merely placeholder values used for illustration and are not intended to be an accurate representation of the values a WAP may obtain during a measurement period.

Various techniques may be employed to store the channel metric history 400 at a WAP. In some example implementations, the WAP may be configured to store only a maximum number of channel metric measurement records 402 in the channel metric history 400, e.g., the most recent one hundred channel metric measurements obtained. In other example implementations, the WAP may be configured to store only those channel metric measurements obtained within a predetermined time period, e.g., the last hour. In further example implementations, the WAP may be configured to purge channel metric measurement records 402 from the channel metric history 400 when the channel metric history exceeds a threshold size (e.g., x kilobytes). The WAP may purge the channel metric history 400 by deleting a predetermined number of the oldest channel metric measurement records 402. As described above, a WAP or a WAP control server may analyze a channel metric history (such as channel metric history 400) to identify channel metric correlations. The channel metric correlations may indicate correlations between a channel metric and a particular timeframe.

The table below illustrates example correlations between overall channel quality and the time-of-day that may be identified through an analysis of one or more channel metric histories. Again the values indicated in the table below are simply used for illustration.

TABLE 1

EXAMPLE CORRELATIONS BETWEEN OVERALL
CHANNEL QUALITY AND TIME-OF-DAY

| Frequency Band | Channel | Time-of-Day | Overall Channel Quality |
|---|---|---|---|
| 2.4 GHz | 1 | 4:30 AM-8:30 AM | 9/10 |
| 2.4 GHz | 1 | 8:30 AM-5:30 PM | 5/10 |
| 2.4 GHz | 1 | 5:30 PM-11:30 PM | 3/10 |
| 2.4 GHz | 1 | 11:30 PM-4:30 AM | 7/10 |
| 2.4 GHz | 2 | 4:30 AM-8:30 AM | 9/10 |
| 2.4 GHz | 2 | 8:30 AM-5:30 PM | 9/10 |
| 2.4 GHz | 2 | 5:30 PM-11:30 PM | 3/10 |
| 2.4 GHz | 2 | 11:30 PM-4:30 AM | 7/10 |
| ... | ... | ... | ... |
| 2.4 GHz | 11 | 4:30 AM-8:30 AM | 9/10 |
| 2.4 GHz | 11 | 8:30 AM-5:30 PM | 8/10 |
| 2.4 GHz | 11 | 5:30 PM-11:30 PM | 7/10 |
| 2.4 GHz | 11 | 11:30 PM-4:30 AM | 6/10 |
| ... | ... | ... | ... |

As seen in Table 1 above, overall channel quality on the 2.4 GHz radio frequency band between the hours of 5:30 PM and 11:30 PM is relatively higher on channel 11. Accordingly, based on these identified correlations, a WAP may switch its operating channel to channel 11 prior to, at the start of, or during this time period. In addition, a WAP may select a sequence of operating channels to use throughout the day based on these identified correlations, e.g., channel 1 for the 4:30 AM-8:30 AM time period, channel 2 for the 8:30 AM-5:30 PM time period, channel 11 for the 5:30 PM-11:30 PM time period, and channel 2 again for the 11:30 PM-4:30 AM time period. The overall channel quality may be derived from one or more of the channel metric measurements, e.g., a model, formula, or other calculation in which the channel metric measurements (e.g., a group of channel metric measurements) are used as input parameters and provides a single overall channel quality value as output. Various combinations of the channel metric measurements identified above may be selectively utilized as the group of channel metric measurements used as the input parameters to derive the overall channel quality value.

As described above, channel metric correlations may be identified for additional and alternative timeframes. The table below illustrates example correlations between overall channel quality and the day of the week.

TABLE 2

EXAMPLE CORRELATIONS BETWEEN OVERALL
CHANNEL QUALITY AND DAY OF THE WEEK

| Frequency Band | Channel | Day of the Week | Overall Channel Quality |
|---|---|---|---|
| 2.4 GHz | 1 | Monday | 7/10 |
| 2.4 GHz | 1 | Tuesday | 8/10 |
| 2.4 GHz | 1 | Wednesday | 3/10 |
| ... | ... | ... | ... |
| 2.4 GHz | 11 | Monday | 5/10 |
| 2.4 GHz | 11 | Tuesday | 4/10 |
| 2.4 GHz | 11 | Wednesday | 8/10 |
| ... | ... | ... | ... |

As seen in Table 2 above, overall channel quality of the 2.4 GHz radio frequency band is relatively higher for Mondays and Tuesdays on channel 1 and relatively higher for Wednesdays on channel 11. Accordingly, based on these identified correlations, a WAP may switch its operating channel to channel 1 for Mondays and Tuesdays and switch its operating channel to channel 11 for Wednesdays. In addition, a WAP may select a sequence of operating channels to use throughout the week based on these identified correlations, e.g., channel 1 for Mondays and Tuesdays, and channel 11 for Wednesdays.

As also described above, channel metric correlations may be identified for multiple timeframes. The table below illustrates example correlations between overall channel quality and time-of-day on days of the week.

TABLE 3

EXAMPLE CORRELATIONS BETWEEN OVERALL
CHANNEL QUALITY AND TIME-OF-DAY ON DAYS
OF THE WEEK

| Frequency Band | Channel | Day of the Week | Time-of-Day | Overall Channel Quality |
|---|---|---|---|---|
| 2.4 GHz | 1 | Monday | 4:30 AM-8:30 AM | 6/10 |
| 2.4 GHz | 1 | Monday | 8:30 AM-5:30 PM | 4/10 |
| 2.4 GHz | 1 | Monday | 5:30 PM-11:30 PM | 7/10 |
| 2.4 GHz | 1 | Monday | 11:30 PM-4:30 AM | 6/10 |
| ... | ... | ... | ... | ... |
| 2.4 GHz | 11 | Monday | 4:30 AM-8:30 AM | 8/10 |
| 2.4 GHz | 11 | Monday | 8:30 AM-5:30 PM | 6/10 |
| 2.4 GHz | 11 | Monday | 5:30 PM-11:30 PM | 5/10 |
| 2.4 GHz | 11 | Monday | 11:30 PM-4:30 AM | 8/10 |
| ... | ... | ... | ... | ... |
| 2.4 GHz | 1 | Saturday | 4:30 AM-8:30 AM | 9/10 |
| 2.4 GHz | 1 | Saturday | 8:30 AM-5:30 PM | 4/10 |
| 2.4 GHz | 1 | Saturday | 5:30 PM-11:30 PM | 8/10 |
| 2.4 GHz | 1 | Saturday | 11:30 PM-4:30 AM | 9/10 |
| ... | ... | ... | ... | ... |
| 2.4 GHz | 11 | Saturday | 4:30 AM-8:30 AM | 5/10 |
| 2.4 GHz | 11 | Saturday | 8:30 AM-5:30 PM | 6/10 |
| 2.4 GHz | 11 | Saturday | 5:30 PM-11:30 PM | 4/10 |
| 2.4 GHz | 11 | Saturday | 11:30 PM-4:30 AM | 6/10 |
| ... | ... | ... | ... | ... |

As seen in Table 3, above, overall channel quality of the 2.4 GHz radio frequency band varies differently throughout the day on different days of the week. In this example, overall channel quality on Mondays is generally higher on channel 11, but on Saturdays, overall channel quality is generally higher on channel 1. As also seen in Table 3, however, overall channel quality is relatively higher on channel 1 rather than channel 11 on Mondays between 5:30 PM and 11:30 PM and relatively higher on channel 11 rather than channel 1 on Saturdays between 8:30 AM and 5:30 PM. These example correlations illustrate the types of nuances that may be advantageously identified through the storage and analysis of channel metric histories and thus used to intelligently configure WAPs to improve their performance in the wireless environments in which they reside.

As noted above, various channel metrics may be employed to assess the quality of the available channels, and the quality of a channel may be represented by a numerical channel score. In some example implementations, the following channel metrics may be employed to calculate the channel score for a channel: utilization of the channel for 802.11 traffic; the number of service set identifiers (SSIDs) detected in the wireless environment and the RSSI for each SSID; the average noise floor of the channel; an indication of identifiable non-802.11 noise; the number of B-mode clients detected on the channel. With respect to the 802.11 traffic, the WAP may be configured to exclude its own utilization of the channel.

As also described above, a WAP control server may issue parameter selection instructions to one or more WAPs that change one or more of their operating parameters in response to receipt of those instructions. In some example implementations, a parameter selection instruction may only specify a particular radio frequency band and a particular channel to use, and the WAP may immediately change its operating radio frequency band and operating channel to those specified in the parameter selection instruction received. As described above, however, a parameter selection instruction may specify a sequence of operating parameters to utilize during a corresponding sequence of timeframes.

The table below illustrates an example of a sequence of operating parameters.

TABLE 4

EXAMPLE PARAMETER SELECTION INSTRUCTION WITH SEQUENCE OF OPERATING PARAMETERS

| Timeframe | Radio Frequency Band | Channel |
|---|---|---|
| 3:00 AM-6:00 AM | 2.4 GHz | 1 |
| 7:00 AM-10:00 AM | 2.4 GHz | 6 |
| 10:00 AM-2:00 PM | 5 GHz | 36 |
| 2:00 PM-5:00 PM | 5 GHz | 40 |
| 5:00 PM-8:00 PM | 5 GHz | 44 |
| 8:00 PM-12:00 AM | 2.4 GHz | 11 |
| 12:00 AM-3:00 AM | — | — |

As seen in Table 4 above, the example parameter selection instruction instructs a WAP to switch between the 2.4 GHz and the 5 GHz radio frequency bands throughout the day. The example parameter selection instruction also instructs to switch between various channels within those respective frequency bands throughout the day. As noted above, a parameter selection instruction may also identify one or more timeframes in which the WAP should deactivate, for example, as shown in Table 4 above between 12:00 AM and 3:00 AM. Additional and alternative examples of correlations and parameter selection instructions will be appreciated with the benefit of this disclosure.

Figure 5:
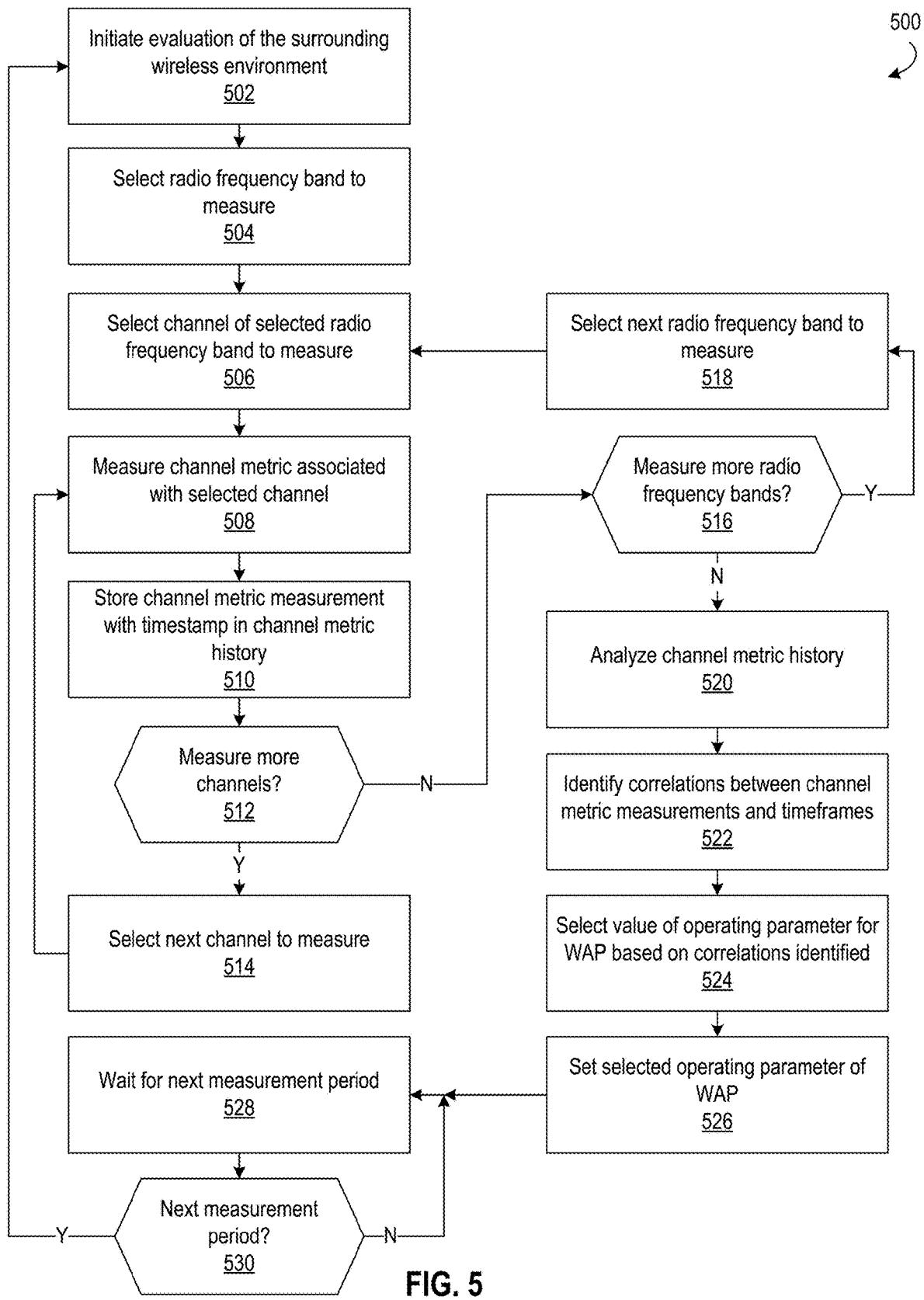
FIG. 5 illustrates a flowchart of example method steps for configuring the operating parameters of a wireless access point in accordance with aspects described herein.

Referring now to FIG. 5, a flowchart 500 of example method steps for configuring the operating parameters of a wireless access device (WAP) based on a history of channel metric measurements is shown. In this example, the WAP itself analyzes the channel metric history and selects one or more operating parameters based on the analysis.

As seen in FIG. 5, a WAP initiates an evaluation of the surrounding wireless environment (block 502). As noted above this evaluation may be referred to as a measurement period. For the measurement period initiated, the WAP selects one or more radio frequency bands to measure (block 504), e.g., the 2.4 GHz and/or 5 GHz radio frequency band. The WAP then selects a channel within the selected radio frequency band to measure (block 506), e.g., channel 6. The WAP then listens for wireless communications transmitted on the selected channel in the surrounding wireless environment and uses a spectrum analyzer to measure a metric associated with the selected channel(s) for the measurement period (block 508). As described above, the WAP may use the spectrum analyzer to measure multiple metrics associated with the selected channel. As also described above, the WAP may derive additional channel metrics (e.g., an overall channel quality) based on one or more of the channel metric measurements obtained during the measurement period.

The WAP stores in a channel metric history the channel metric measurements obtained during the measurement period along with a timestamp the measurements were obtained (block 510). Having measured the selected channel, the WAP determines whether any additional channels in the selected radio frequency band remain to be measured (block 512). As noted above, the WAP may measure and obtain channel metric measurements for each channel in the selected radio frequency band. If there are additional channels to measure (block 512:Y), then the WAP selects the next channel to measure (block 514) and repeat the steps illustrated by blocks 508-510 in order to obtain channel metric measurements for the next channel selected.

Once no more channels remain to be measured (block 512:N), the WAP may determine whether there are additional radio frequency bands to measure (block 516). As also noted above, the WAP may measure and obtain channel metric measurements for the channels of each radio frequency band the WAP is configured to transmit on. If there are additional radio frequency bands to measure (block 516:Y), then the WAP selects the next radio frequency band to measure (block 518) and repeats the steps illustrated by blocks 506-510 to obtain channel metric measurements for one or more of the channels of the next radio frequency band selected. As noted above, the channel metric measurements obtained for the respective channels and radio frequency bands during a measurement period may be collectively referred to as a set of channel metric measurements.

Once no more radio frequency bands remain to be measured (block 516:N), the WAP analyzes channel metric history (block 520) to identify correlations between the channel metric measurements obtained and the various timeframes (block 522). Having identified correlations between channel metric measurements and various timeframes, the WAP selects a value of an operating parameter based on the correlations identified (block 524). The WAP then sets one or more of its operating parameters to the selected values (block 526). As described above, the WAP may select respective values multiple operating parameters, e.g., the radio frequency band to use, the particular channel to use within that radio frequency band, and a wireless networking standard to use. As also described above, the WAP may set one or more of its operating parameters for a particular timeframe (e.g., between 4:30 AM and 8:30 AM) or a sequence of timeframes based on the correlations identified. It will be recognized, however, that WAP may in some circumstances determine, based on the correlations identified, that its current operating parameters do not need reconfiguration, e.g., that its currently selected radio frequency band and the currently selected channel are the relatively best radio frequency band and channel available with the surround wireless environment.

The WAP may continually evaluate the wireless environment in which it resides. Accordingly, after the WAP completes one measurement period—which may or may not result in a reconfiguration of its operating parameters based on the correlations identified—the WAP waits for the next measurement period (block 528). Until the next measurement period (block 530:N), the WAP may continue to exchange wireless communications with various devices in the surrounding wireless environment. When the next measurement period arrives (block 530:Y), the WAP may once again initiate an evaluation of the surrounding wireless environment (block 502) and repeat the steps illustrated by blocks 504-526 to collect channel metric measurements for the next measurement period, update the channel metric history, and identify (or refine) correlations based on the new channel metric measurements obtained.

Figure 6:
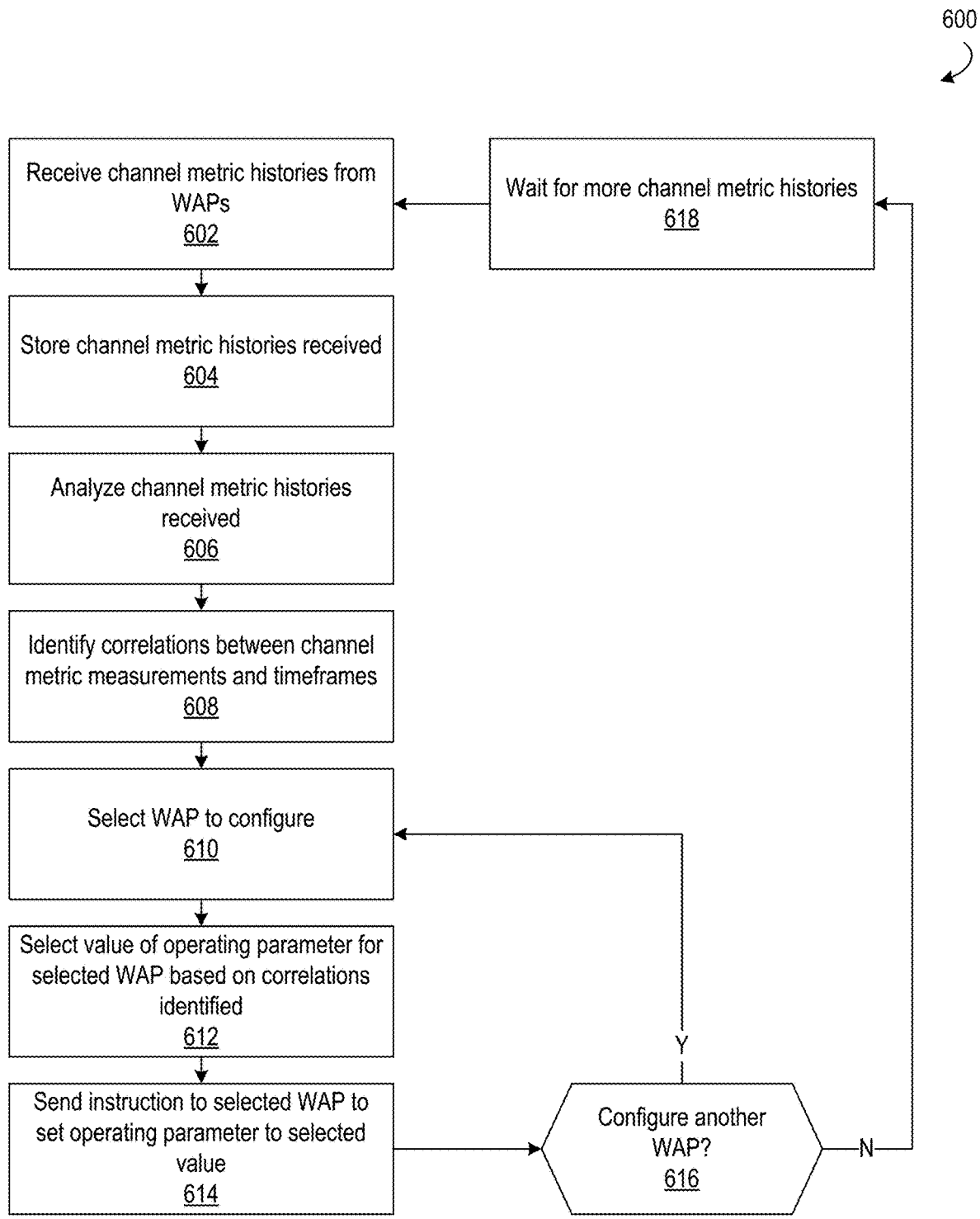
FIG. 6 illustrates a flowchart of example method steps for configuring the operating parameters of multiple wireless access points in accordance with aspects described herein.

Referring now to FIG. 6, a flowchart 600 of example method steps for configuring the operating parameters of multiple wireless access points (WAPs) based on histories of channel metric measurements is shown. In this example, a centralized WAP control server in signal communication with multiple WAPs analyzes the channel metric histories received from those WAPs and issues parameter selection instructions to the WAPs based on those analyses.

As seen in FIG. 6, a WAP control server receives respective channel metric histories from the WAPs it is in signal communication with (block 602). The WAP control server may be in signal communication with a set of WAPs that each reside within the same wireless environment (e.g., located in the same geographic area within wireless range of each other). In addition, the WAP control server may be in signal communication with multiple sets of WAPs wherein each set of WAPs is associated with a respective wireless environment. The WAP control server may store the channel metric histories received (block 604) and analyze those channel metric histories (block 606) to identify correlations between the channel metric measurements of the channel metric histories and various timeframes (block 608) as described above.

The WAP control server then selects a WAP to configure (block 610) and, based on the correlations identified, selects one or more value for one or more operating parameters of the selected WAP (block 612). The WAP control server sends a parameter selection instruction to the selected WAP identifying the selected values of the operating parameters (block 614). As noted above, the WAP control server may configure multiple WAPs based on the correlations identified, e.g., instruct three neighboring WAPs to operate on channel 1, 6, and 11 respectively. Accordingly, if there are additional WAPs to configure (block 616:Y), the WAP control server may select another WAP to configure (block 610), and repeat the steps illustrated by blocks 612-614 to select, for that next selected WAP, one or more operating parameters based on the correlations identified. The WAP control server may likewise determine, based on the analysis of the channel metric histories and the correlations identified, that no changes are needed to the operating parameters of a WAP.

If no additional WAPs remain to be configured (block 616:N), the WAP control server may wait to receive additional channel metric histories from the WAPs (block 618) and repeat the steps illustrated by blocks 602-616 upon receipt of new channel metric histories. In this way, the WAP control server may continually update the channel metric measurements for a wireless environment and identify new correlations or refine existing correlations.

Figure 7:
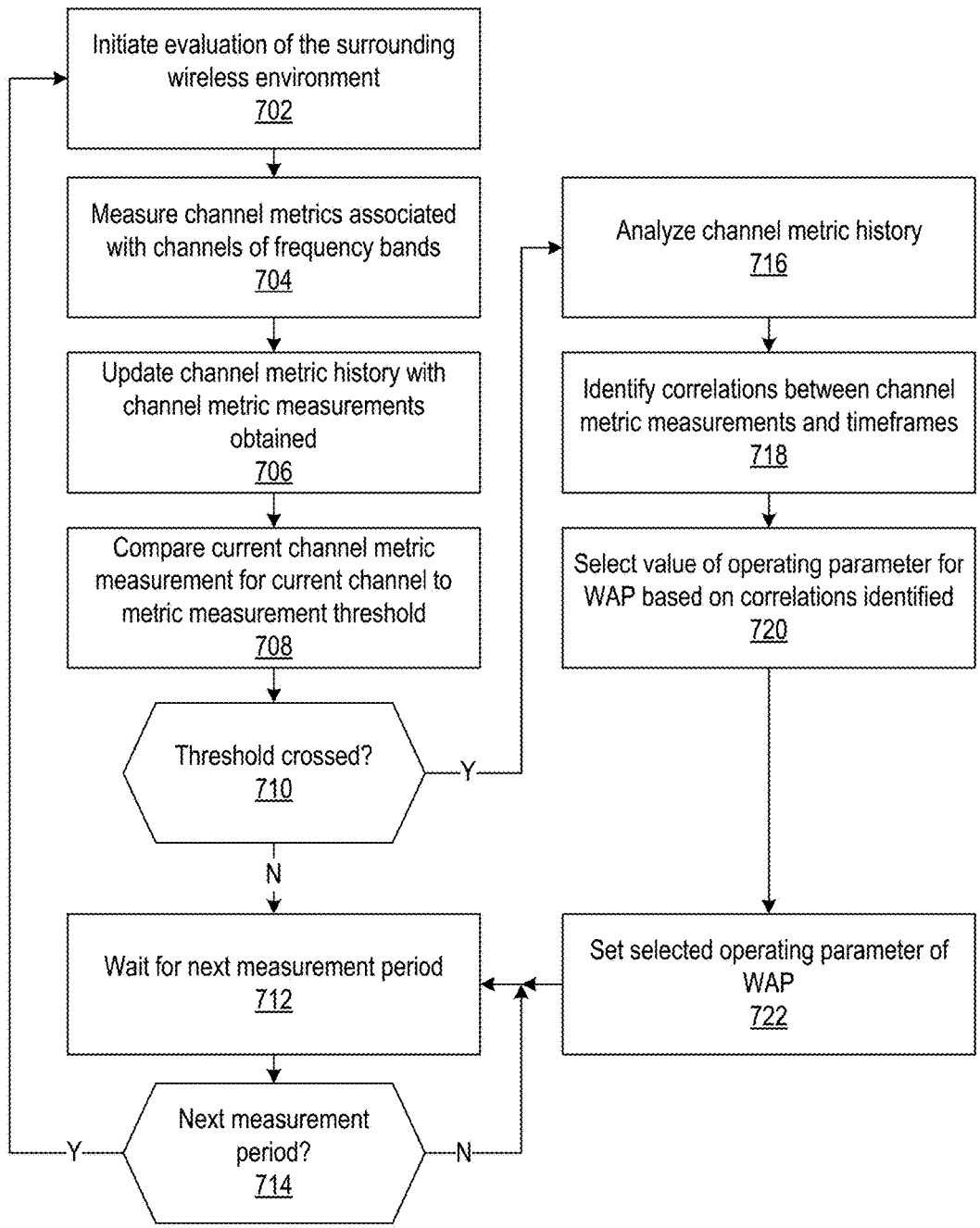
FIG. 7 illustrates a flowchart of example method steps for determining whether to reconfigure the operating parameters of a wireless access point in accordance with aspects described herein.

Referring now to FIG. 7, a flowchart 700 of example method steps for determining whether to reconfigure the operating parameters of a wireless access point (WAP) is shown. As noted above, WAPs, in some example implementations, may only reconfigure its operating parameters based on correlations identified from the analysis of a channel metric history in response to determining that a channel metric measurement has crossed a metric measurement threshold.

As seen in FIG. 7, a WAP initiates, at the start of a new measurement period, an evaluation of the surrounding wireless environment (block 702). The WAP uses a spectrum analyzer to measure channel metrics associated with one or more channels of one or more frequency bands (block 704) during the measurement period and updates its channel metric history with the channel metric measurements obtained during that measurement period (block 706). The WAP then compares a current channel metric measurement measured on the current operating channel of the WAP— e.g., the current noise in the wireless environment on the current operating channel—and compares that channel metric measurement to a metric measurement threshold (block 708), e.g., a noise threshold. The WAP may then determine whether to reconfigure one or more of its operating parameters based on whether the current channel metric measurement has crossed the metric measurement threshold. Other aspects that may trigger a change to the operating parameters include the inability to obtain a transmit window for a predetermined duration, the transmit buffer of the WAP exceeding a predetermined threshold (i.e., a transmit buffer threshold), and the current channel utilization reaching a predetermined threshold (i.e., a channel utilization threshold).

If the current channel metric measurement has not crossed the metric measurement threshold (block 710:N), the WAP may wait until the next measurement period (block 712) during which a new channel metric measurement may be obtained. Until the next measurement period (block 714:N), the WAP may continue to exchange wireless communications with various devices in the surrounding wireless environment. When the next measurement period arrives (block 714:Y), the WAP may once again initiate an evaluation of the surrounding wireless environment (block 702) and repeat the steps illustrated by blocks 704-710 to compare a current channel metric measurement to a metric measurement threshold and determine whether to reconfigure its operating parameters based on that comparison.

If the current channel metric measurement has crossed the metric measurement threshold (block 710:Y), then the WAP analyzes the channel metric history (block 716) and identifies correlations between channel metric measurements and various timeframes (block 718). The WAP then selects a value for one of its operating parameters based on the correlations identified (block 720) and sets that operating parameter to the selected value (block 722). As an example, the WAP may determine which value has historically been the relatively better value for the current timeframe based on the correlations identified and change the selected operating parameter to that value. As noted above, the WAP may select new values for multiple operating parameters based on the correlations identified or determine that the current value of the operating parameter is the best available based on the correlations identified.

Having reconfigured one or more of its operating parameters in response to determining a current channel metric measurement has crossed a measurement threshold, the WAP may wait for the next measurement period (block 712) and compare the subsequent channel metric measurement obtained during that measurement period to the metric measurement threshold. In some example implementations, the evaluation of the surrounding wireless environment and the comparison of the current channel metric measurement to the threshold may occur at different intervals. As an example, the WAP may evaluate the surrounding wireless environment every hour while comparing a current channel metric measurement to the metric measurement threshold every half-hour. Additional examples will be appreciated with the benefit of this disclosure.

Although wireless networking technologies may operate using unlicensed frequency bands, the channel metric histories generated by WAPs may be utilized to implement a form of self-governance among the various network service providers that provide wireless network access in the same geographic region. In particular a centralized clearinghouse may function to issue operating parameters to a network service provider in advance of deploying a new WAP to a geographic region. The clearinghouse may maintain a repository of channel metric histories generated by the WAPs of various network service providers deployed to various geographic regions. The clearinghouse may analyze those channel metric histories to identify operating parameters for new WAPs being deployed. The clearinghouse may select the operating parameters such that interference experienced or caused by the new WAP is minimized once deployed.

Figure 8:
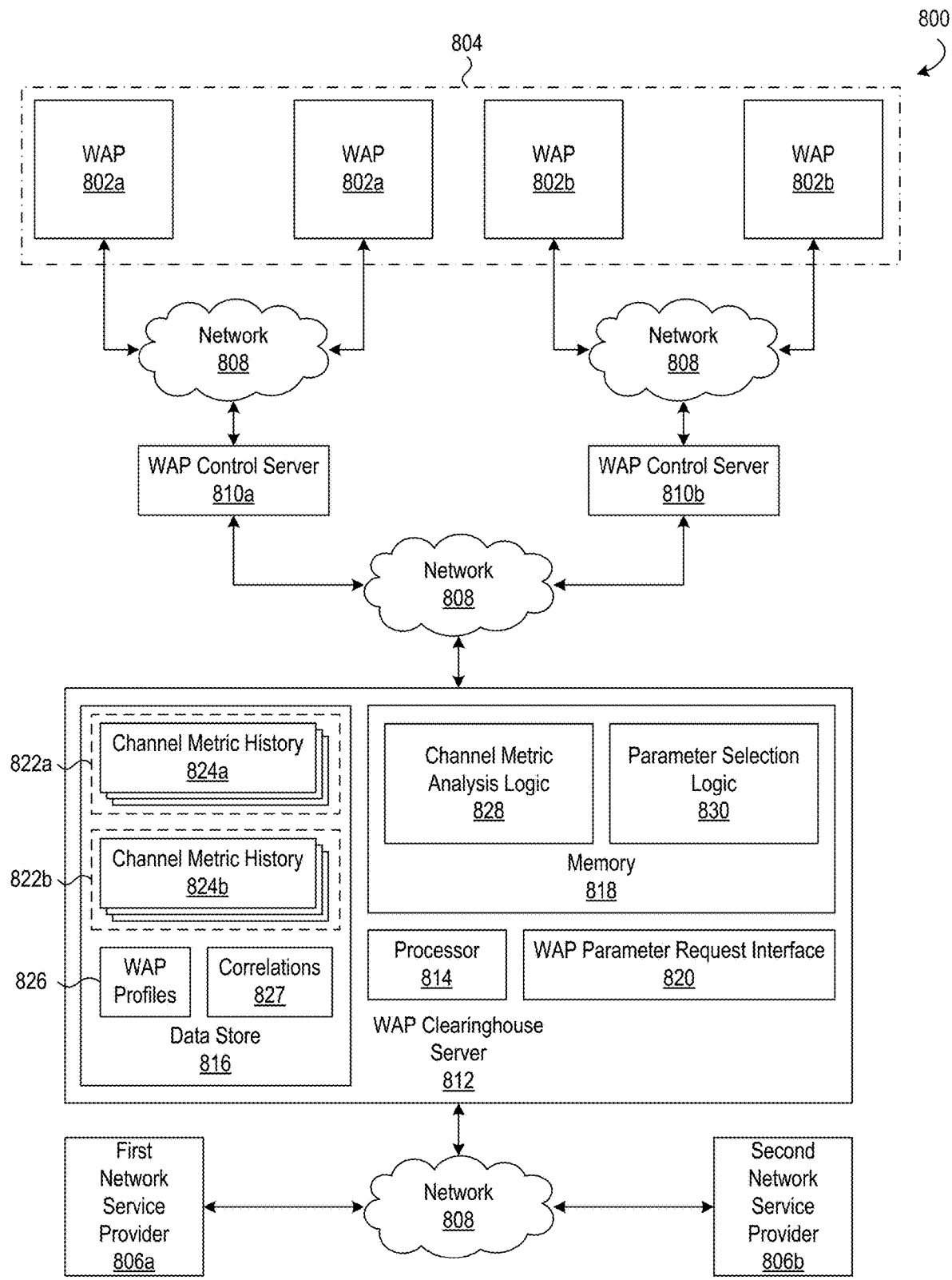
FIG. 8 illustrates an example of an implementation of a system for providing operating parameters for wireless access points deployed by different network service providers in accordance with aspects described herein.

Referring now to FIG. 8, an example of an implementation of a system 800 for providing operating parameters for WAPs deployed by different network service providers is shown. As seen in FIG. 8, multiple WAPs 802*a* and 802*b* are deployed in a wireless environment 804. The WAPs 802*a-b* may be the same as, or at least similar to the WAPs described above with reference to FIGS. 2A-B.

As noted above, the wireless environment may be a premises, a geographic region or public/private space. As also noted above, different network service providers may deploy WAPs in the wireless environment to provide network access to devices associated with those network providers, e.g., the devices of customers, employees, and the like. In FIG. 8, the WAPs 802*a* are associated with a first network service provider 806*a*, and the WAPs 802*b* are associated with a second network service provider 806*b*— e.g., the first network service provider may own, operate, and/or deploy the WAPs 802*a* in the wireless environment 804, and the second network service provider may own, operate, and/or deploy the WAPs 802*b* in the wireless environment. Although only one wireless environment is shown in FIG. 8, the WAP control servers 810*a-b* may be in signal communication with WAPs deployed in multiple wireless environments.

The WAPs 802*a* and 802*b*, in this example, are in signal communication, via a network 808, with respective WAP controllers, which may be computing devices such as control servers. The WAPs 802*a* are in signal communication with the WAP control server 810*a*, and the WAPs 802*b* are in signal communication with the WAP control server 810*b*. The WAP control servers 810*a-b* may likewise be the same as, or at least similar to, the WAP control server discussed above with reference to FIG. 2B. Accordingly, the WAP control servers 810*a-b* may receive and store channel metric histories from the WAPs 802*a-b* respectively. The WAP control servers 810*a-b* may likewise analyze the channel metric histories received, identify channel metric correlations based on the analyses of the channel metric histories, and issue parameter selection instructions to the WAPs 802*a-b* respectively based on those channel metric histories. The WAP control servers 810*a-b* are also likewise associated with the respective network service providers 806*a-b*. The WAP control server 810*a* may be owned and/or operated by the first network service provider 806*a*, and the WAP control server 810*b* may be owned and/or operating by the second network service provider 806*b*.

As also seen in FIG. 8, each of the WAP control servers 810*a-b* are in signal communication, via a network 808, with a computing device such as a WAP clearinghouse server 812. The WAP clearinghouse server 812, in this example, handles requests from network service providers that operate or plan to deploy new WAPs to a wireless environment. The WAP clearinghouse server 812 collects and analyzes the channel metric histories generated by the WAPs presently deployed in that environment. Based on the channel metric correlations identified through those analyses, the WAP clearinghouse server 812 selects one or more operating parameters for the new WAP operating or being deployed to the wireless environment so as to minimize interference caused by the new WAP when deployed to the wireless environment. The WAP clearinghouse server 812 provides the selected operating parameters to the network service provider deploying the WAP which configures the WAP based on the operating parameters received. In this way, the WAP clearinghouse server 812 advantageously facilitates an efficient use of the radio frequency bands notwithstanding the unlicensed nature of those bands.

The WAP clearinghouse server 812, in this example, is a special-purpose computing device that includes a processor 814, a data store 816, and memory 818 storing executable instructions. The WAP clearinghouse server 812 also includes a WAP parameter request interface 820 that receives the requests from network services providers for WAP operating parameters and provides the corresponding responses that include the selected operating parameters for the WAP. The data store 816 stores individual sets of channel metric histories for respective network service providers. The WAP clearinghouse server 812 may receive the channel metric histories from the WAP control servers in signal communication with the WAP clearinghouse server. With respect to FIG. 8, the WAP control server 810*a* may forward to the WAP clearinghouse server 812 the channel metric histories respectively received from the WAPs 802*a*, and the WAP control server 810*b* may forward to the WAP clearinghouse server the channel metric histories respectively received from the WAPs 802*b*.

Accordingly, in FIG. 8, the data store 816 of the WAP clearinghouse server 812 stores a first set 822*a* of channel metric histories 824*a* respectively generated by the WAPs 802*a* associated with the first network service provider 806*a* and stores a second set 822*b* of channel metric histories 824*b* respectively generated by the WAPs 802*b* associated with the second network service provider 806*b*. The data store 816 of the WAP clearinghouse server 812 also stores WAP profiles 826 for the WAPs associated with the channel metric histories 824*a-b* received. Each WAP profile 826 may include, for a respective WAP, a unique identifier for the WAP, a network service provider the WAP is associated with, the transmit capabilities of the WAP, and a location at which the WAP is deployed. The data store 816 of the WAP clearinghouse server 812 may also store profiles (not shown) for the network service providers which may include, e.g., a unique identifier for the network service provider, a total number of WAPs deployed, and the like. The data store 816 also stores the channel metric correlations 827 identified through the analysis of the channel metric histories 824*a-b* which the WAP clearinghouse server 812 utilizes to select operating parameters for WAPs. The correlations 827 may likewise be replaced and/or updated based on subsequent analyses of channel metric histories as described above. In addition, the WAP clearinghouse server 812 may identify the wireless environment the correlations 827 are associated with, e.g., the particular geographic region or public/private space. In this way, the WAP clearinghouse server 812 may retrieve previously identified correlations 827 for a wireless environment when selecting one or more operating parameters for a WAP being deployed to that wireless environment.

The executable instructions stored in the memory 818, in this example, include channel metric analysis logic 828 and parameter selection logic 830. The channel metric analysis logic 828 may be the same as, or at least similar to, the channel metric analysis logic discussed above as it analyzes the channel metric histories 824*a-b* to identify correlations between channel metric and various timeframes. The channel metric analysis logic 828, however, analyzes the channel metric histories of WAPs associated with different network service providers to identify the correlations. The parameter selection logic 830 may likewise be the same as, or at least similar to, the parameter selection logic discussed above as it selects one or more operating parameters for WAPs. The parameter selection logic 830, however, selects operating parameters for WAPs associated with different network service providers. The WAP clearinghouse server 812 may transmit parameter selection instructions to the WAP control servers 810a-b which, in turn, transmit the parameter selection instructions to the appropriate WAPs 802a-b deployed in the wireless environment 804.

The WAP parameter request interface 820 also utilizes the parameter selection logic 830 to select one or more operating parameters for a new WAP in response to receipt of a request from a network service provider. As seen in FIG. 8, the first network service provider 806a and the second network service provider 806b are each in signal communication with the WAP clearinghouse server 812 via the network 808. The WAP parameter request interface 820 may be implemented as an application programming interface (API) and accessed, e.g., through a web server via the network 808. The network 808 may include, for example, a wide area network (WAN) such as the Internet.

The WAP parameter request interface may specify a request format to use when requesting operating parameters for a new WAP to be deployed to a wireless environment. The request format may include a tuple of information, e.g., {unique WAP identifier, unique network service provider identifier, WAP transmit capabilities, location}. The unique WAP identifier may be, e.g., a serial number of the new WAP or a MAC address of the new WAP. The unique network service provider identifier may be a serial number associated with the network service provider that is deploying the WAP. The transmit capabilities of the WAP may include the frequency bands the WAP is configured to transmit on (e.g., 2.4 GHZ, 5 GHz), the wireless networking standards the WAP is configured to utilize, the number of radios of the WAP, the maximum transmit power of the WAP, an expected wireless range of the WAP, and the like. The location may include an indication of the geographic region and/or space the WAP will be deployed in (e.g., latitude/longitude coordinates, street address, floor number). It will be appreciated that the network service provider may provide this information in a sequence of multiple requests/responses.

In response to receipt of a request at the WAP parameter request interface 820, the parameter selection logic 830 may either retrieve the correlations 827 associated with the location indicated in the request or generate new correlations by performing a new analysis of the channel metric histories associated with the WAPs deployed in the location indicated. If performing a new analysis, the parameter selection logic 830 identifies the WAPs deployed in the location indicated, e.g., based on the location information included in the WAP profiles. The channel metric analysis logic then retrieves from the data store 816 the channel metric histories associated with the WAPs identified and performs an analysis of those channel metric histories to identify channel metric correlations for the location specified in the request. The parameter selection logic 830 selects one or more operating parameters for the new WAP and provides the WAP parameter request interface 820 with the operating parameters selected. The WAP parameter request interface then transmits to the network service provider a response with the operating parameters selected. The response may likewise include a tuple of information, e.g., {frequency band, channel, transmit power}. As described above, the response may include a sequence of operating parameters the new WAP should utilize at various timeframes.

Figure 9:
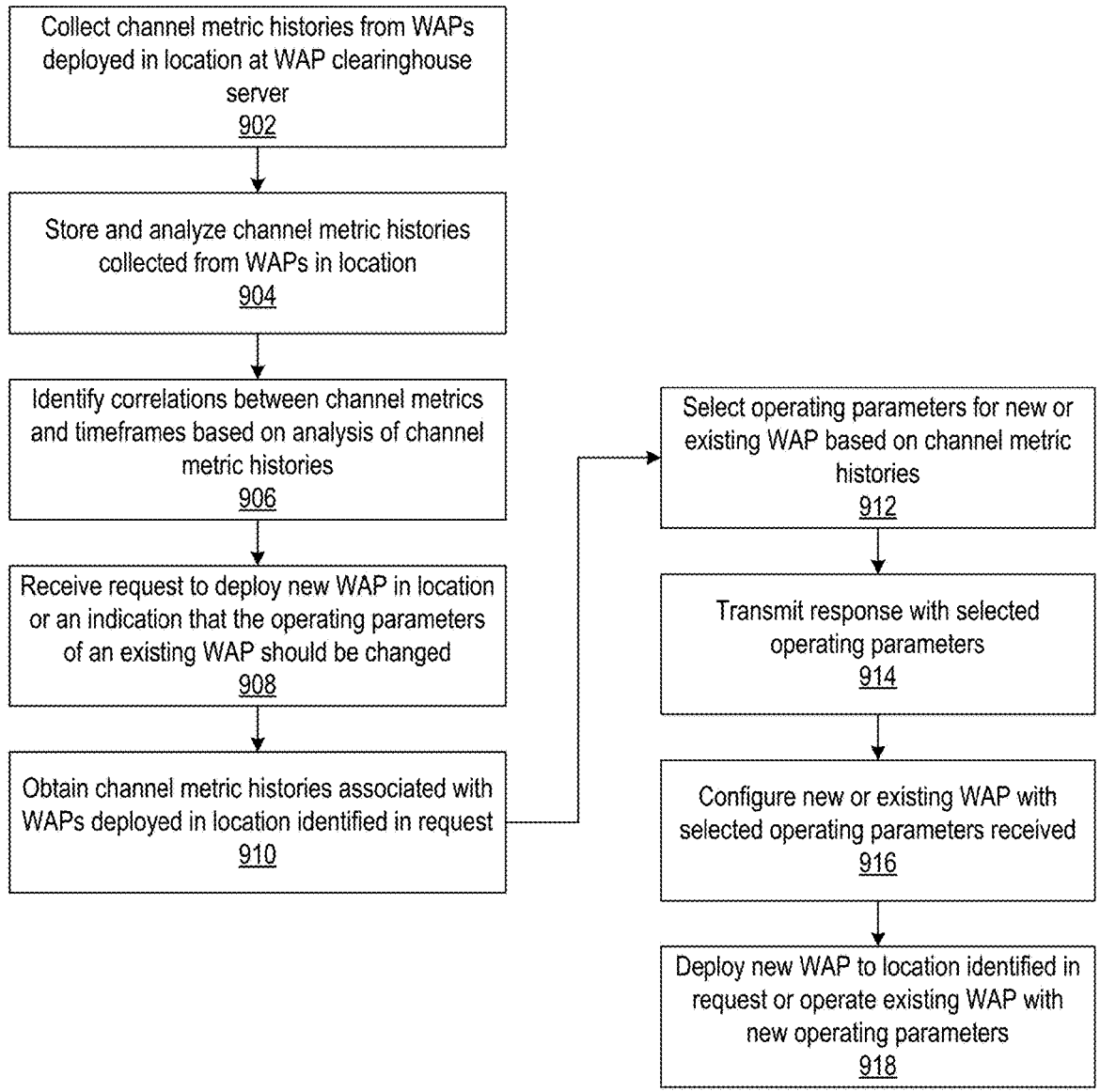
FIG. 9 illustrates a flowchart of example method steps for providing operating parameters for wireless access points using a clearinghouse in accordance with aspects described herein.

Referring to FIG. 9, a flowchart 900 of example method steps for providing WAP operating parameters using a WAP clearinghouse server is shown. As seen in FIG. 9, a WAP clearinghouse server collects channel metric histories from WAPs deployed in a particular location (block 902). As noted above, the WAPs deployed in that location may be respectively associated with different network service providers. The WAP clearinghouse server stores and analyzes the channel metric histories collected (block 904) and identifies for the location correlations between channel metric measurements and various timeframes (block 906).

The WAP clearinghouse server may then receive from a network service provider a request to deploy a new WAP in the wireless environment or an indication that one or more operating parameters of an existing WAP deployed to the wireless environment should be changed (block 908). The WAP clearinghouse server obtains the channel metric histories associated with the WAPs deployed in the location identified in the request (block 910) and selects one or more operating parameters for the new or existing WAP based on those channel metric histories (block 912), e.g., based on the correlations identified between the channel metric measurements in the channel metric histories and various timeframes. The WAP clearinghouse transmits to the network service provider a response that includes the operating parameters selected for the new WAP (block 914). The network service provider may then configure the new or existing WAP with the operating parameters received (block 916) and deploy the new WAP to the location identified in the request or operate the existing WAP with the one or more new operating parameters (block 918). A WAP clearinghouse server may repeat the example steps illustrated in FIG. 9 to provide operating parameters to additional WAPs associated with the same or a different network service provider to be deployed to the same or a different location.

The techniques discussed with reference to FIGS. 8-9 above may also be employed by a network service provider itself using one of its WAP control servers when deploying WAPs to new customer sites. In a residential space, for example, a new customer may sign up to receive wireless network service from the network service provider. Installation of wireless networking equipment at the customer site may include deploying a new WAP at the customer site. Before deploying the WAP, however, the network service provider may query the WAP control server that receives the channel metric histories from the various WAPs presently deployed at the residential space. Similar to the techniques described above, the network service provider may request operating parameters for the new WAP to be deployed at the customer site. The WAP control server may analyze the channel metric histories associated with the WAPs deployed in the residential space and identify correlations between channel metric measurements and various timeframes. The WAP control server may then select operating parameters for the WAP based on those channel metric histories and correlations identified, and the network service provider may configure the WAP with the selected operating parameters during installation at the customer site. In this way, the network service provider advantageously minimizes interference experienced by the neighboring WAPs at the residential space.

With respect to changing the operating parameters of a WAP, various strategies may be employed. In some example implementations, a WAP may change one or more of its operating parameters (e.g., the operating channel) immediately in response to determining that a current channel metric measurement has crossed a channel metric measurement threshold. Such a reactive change to the operating parameters of the WAP, however, may negatively impact any devices currently connected to the WAP. To mitigate the negative impact on devices currently connected to the WAP, the WAP, in some other example implementations, may be configured to only change its operating parameters during off-peak usage hours as determined by the history of channel metric measurements collected by the WAP. In addition, the WAP, in some example implementations, may be configured such that it is limited in the number of times it is permitted to change its operating parameters within a predetermined time period, e.g., no more than three changes to its operating parameters within a 24 hour period or no more than one change to its operating parameters within a one hour period. In some example implementations, a WAP may also be configured such that changes to operating parameters are not permitted if the average data throughput at the WAP exceeds a specified threshold within a predetermined time period, i.e., an average of x kilobits per second (kbps) within the last y minutes (e.g., an average of 512 kbps within the last five minutes). The average data throughput as well as the predetermined time period may be configurable parameters at the WAP. Various techniques may be employed to configure the average data throughput and the predetermined time period including, e.g., configuring via the boot file and/or via SNMP OIDs. In addition, a WAP may be configured, in some example implementations, such that changes to operating parameters are not permitted if the WAP is currently handling a predetermined type of traffic, e.g., audio streaming traffic or video streaming traffic. Quality of Service (QoS) tagging may be employed to differentiate between different types of traffic, and the types of traffic that can prevent changes to the WAP operating parameters may likewise be configurable at the WAP, e.g., via a boot file and/or via SNMP OIDs.

Furthermore, the WAPs, in some example implementations, may be configured to transmit an announcement indicating a change to the operating parameters of the WAP (e.g., a "channel switch announcement") to allow rapid re-authentication of any devices connected to the WAP during the change of operating parameters. Moreover, the WAPs, in some example implementations, may be configured such that they are not permitted to change their operating parameters when, e.g., a threshold number of devices are currently connected to the WAPs or the WAPs are handling a threshold level of traffic between the devices. Such techniques likewise mitigate any negative affects resulting from changing WAP operating parameters while actively servicing devices.

In addition, qualitative assessments may be employed to describe the operating parameters of the WAP (e.g., the channels, the frequency band, etc.) based on the history of channel metric measurements. For example, in some implementations, channels may be categorized into four different levels for various time periods based on the history of channel metric measurements, e.g., "perfect," "good," "impaired," and "unusable." Each level may correspond to a respective channel metric measurement threshold. Accordingly, a channel may, as an example, be categorized as "perfect" for the hours of 1:00 AM-5:00 AM when an historic channel metric measurement for that time period is below a first channel metric measurement threshold, as "good" for the hours of 5:00 AM-8:00 AM when an historic channel metric measurement for that time period is between the first channel metric measurement threshold and a second channel metric measurement threshold, as "impaired" for the hours of 8:00 AM-4:00 PM when an historic channel metric measurement for that time period is between the second channel metric measurement threshold and a third channel metric measurement threshold, and as "unusable" for the hours of 4:00 PM-10:00 PM when an historic channel metric measurement for that time period is above the third channel metric measurement threshold. Additional examples will be appreciated with the benefit of this disclosure.

For low-level categories (e.g., "unusable" and "impaired"), the WAPs in these example implementations may be configured and permitted to change their operating parameters after various time periods. For example, when a channel has been categorized as "unusable" for a particular time period, a WAP may be configured such that it is permitted to change its operating parameters after a fifteen minutes duration of operating on that channel. As another example, when a channel has been categorized as "impaired" for a particular time period, the WAP may be configured such that it is permitted to change its operating parameters after a one hour duration of operating on that channel. Additional examples will be appreciated with the benefit of this disclosure. As noted above, in some example implementations, a WAP may be configured such that it is not permitted to change its operating parameters if the prior change occurred within a predetermined time period, e.g., the last hour.

In addition, a WAP, in some example implementations, may be configured such that it is only permitted to change its operating parameters when a higher-ranked operating parameter is available (e.g., a higher-ranked channel) as determined by the history of channel metric measurements. As an example, when the current operating channel of the WAP has been categorized as "unusable" for the current time period, the WAP may be configured such that it may only change its operating channel when another channel has been categorized as "impaired," "good," or "perfect," for the current time period. As another example, when the current operating channel of the WAP has been categorized as "impaired," for the current time period, the WAP may be configured such that it may only change its operating channel when another channel has been categorized as "good" or "perfect" for the current time period. As a further example, when the current operating channel of the WAP has been categorized as "good" for the current time period, the WAP may be configured such that it may only change its operating channel when another channel has been categorized as "perfect" for the current time period. Additional examples will be appreciated with the benefit of this disclosure, e.g., with respect to other types operating parameters such as the frequency band selected.

All of the thresholds identified above may be, in some example implementations, configurable. The thresholds may be manually configurable by an individual in addition to or alternatively by the WAP itself or a control system for the WAP (e.g., the WAP control server). Finally, the WAPs, in some example implementations, may be configured to transmit (e.g., using beacons) the current and historic channel metric measurements collected to neighboring WAPs or devices which may leverage the channel metric measurements received in those transmissions when configuring one or more operating parameters as described herein.

Figure 10:
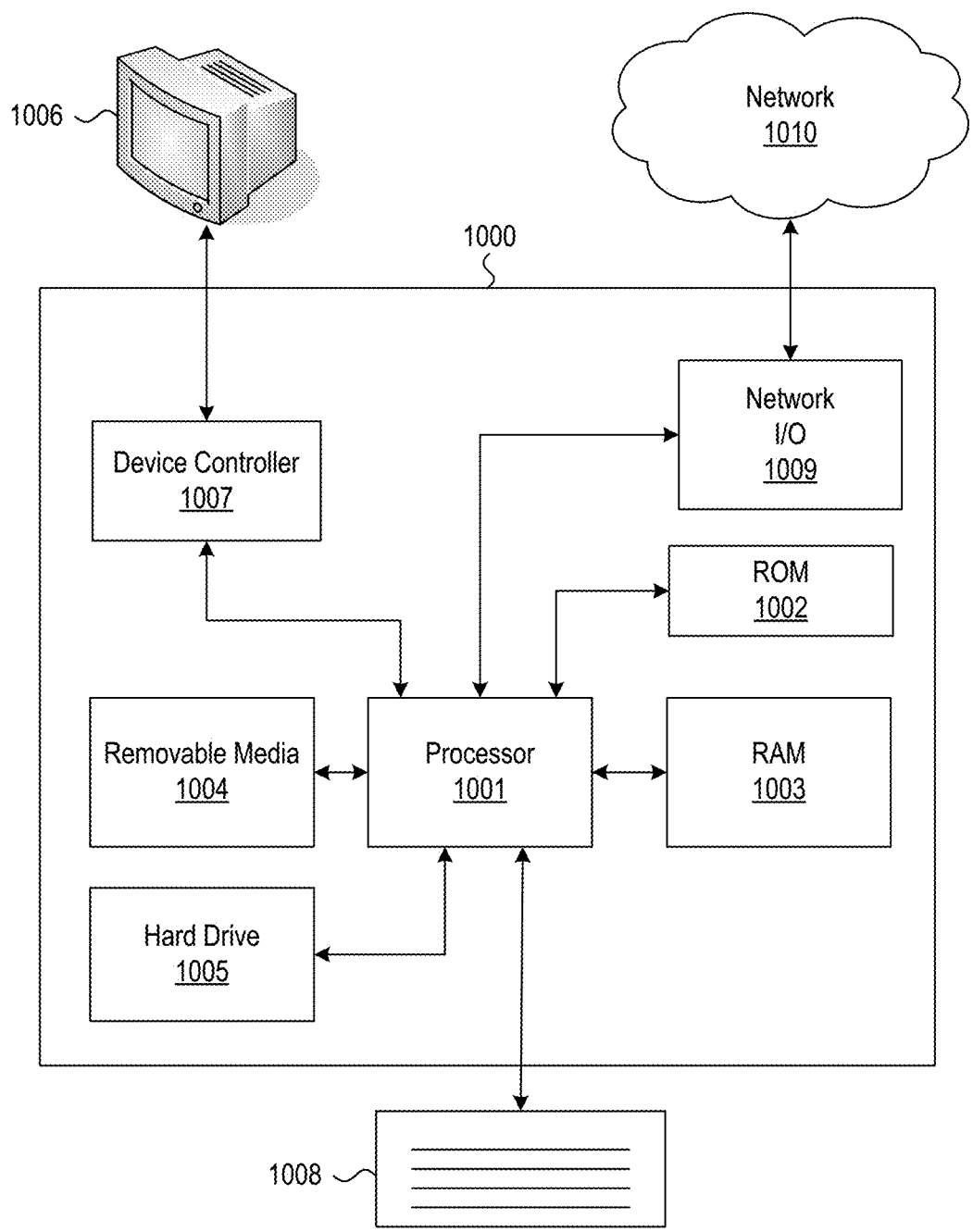
FIG. 10 illustrates an example hardware platform on which the various elements described herein can be implemented.

Referring now to FIG. 10, an example of an implementation of a hardware platform on which the various elements described herein can be implemented is shown. The computing device 1000 may include one or more processors 1001, which may execute instructions of a computer program to perform any of the features described herein. The instructions may be stored in any type of computer-readable medium or memory, to configure the operation of the processor 1001. For example, instructions may be stored in a read-only memory (ROM) 1002, random access memory (RAM) 1003, removable media 1004, such as a Universal Serial Bus (USB) drive, compact disk (CD) or digital versatile disk (DVD), floppy disk drive, or any other desired electronic storage medium. Instructions may also be stored in an attached (or internal) hard drive 1005. The computing device 1000 may include one or more output devices, such as a display 1006 (or an external television), and may include one or more output device controllers 1007, such as a video processor. There may also be one or more user input devices 1008, such as a remote control, keyboard, mouse, touch screen, microphone, etc. The computing device 1000 may also include one or more network interfaces, such as input/output circuits 1009 (such as a network card) to communicate with an external network 1010. The network interface may be a wired interface, wireless interface, or a combination of the two. In some embodiments, the interface 1009 may include a modem (e.g., a cable modem), and network 1010 may include the communication lines, the external network 1009, an in-home network, a service provider's wireless, coaxial, fiber, or hybrid fiber/coaxial distribution system (e.g., a DOCSIS network), or any other desired network.

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings.

For example, the steps illustrated in the illustrative figures may be performed in other than the recited order, and that one or more steps illustrated may be optional in accordance with aspects of the disclosure. It will also be appreciated and understood that modifications may be made without departing from the true spirit and scope of the present disclosure. The description is thus to be regarded as illustrative instead of restrictive on the present disclosure.

What is claimed is:

1. A method comprising:
   receiving a plurality of metrics for a plurality of channels of a radio frequency band;
   determining that a difference between a first average, of the plurality of metrics and associated with a first timeframe, and a second average, of the plurality of metrics and associated with a second timeframe, is equal to or greater than a threshold amount, wherein the first timeframe is different from the second timeframe;
   adjusting, by a wireless access point and based on the determining, an operating parameter of the wireless access point; and
   sending wireless communications using the adjusted operating parameter.

2. The method of claim 1, wherein:
   adjusting the operating parameter comprises adjusting one or more of the radio frequency band, a channel within the radio frequency band, a wireless networking standard for the wireless access point, or a transmit power.

3. The method of claim 1, further comprising:
   storing the plurality of metrics in a history of channel metric measurements, wherein the first timeframe and the second timeframe are consecutive timeframes.

4. The method of claim 1, further comprising:
   reassigning, by the wireless access point and based on a history of use of a first channel of the plurality of channels, a connected device from the first channel to a second channel of the plurality of channels.

5. The method of claim 1, further comprising:
   storing information indicating a usage level of a first channel for different times of day.

6. The method of claim 1, wherein:
   receiving the plurality of metrics comprises receiving the plurality of metrics at periodic intervals.

7. The method of claim 1, wherein:
   receiving the plurality of metrics comprises receiving a metric for each channel of each radio frequency band the wireless access point is configured to utilize.

8. The method of claim 1, wherein:
   the plurality of metrics comprises one or more of:
   a measurement of traffic on each channel of the plurality of channels of the radio frequency band,
   a total quantity of wireless access points utilizing each channel of the plurality of channels of the radio frequency band,
   a bandwidth utilization of each channel of the plurality of channels of the radio frequency band, or
   a transmit opportunity on each channel of the plurality of channels of the radio frequency band.

9. The method of claim 1, further comprising:
   sending the plurality of metrics to a computing device located remotely from the wireless access point.

10. The method of claim 1, further comprising:
    disabling, based on a connected device receiving streaming traffic via an operating channel of the plurality of channels, adjustment of an operating channel.

11. The method of claim 1, wherein the operating parameter comprises an operating channel and the method further comprises:
    scheduling selection of the operating channel based on a pattern of channel use identified from historical metric values.

12. The method of claim 1, wherein the first average comprises an average of a subset of the plurality of metrics, associated with a first timeframe; and the second average comprises an average of the subset of the plurality of metrics, associated with a second timeframe.

13. The method of claim 1, further comprising:
    storing information indicating a usage level of a first channel, of the plurality of channels, for different times of day; and
    adjusting, by the wireless access point and based on the information, an operating parameter of the wireless access point.

* * * * *

UNITED STATES PATENT AND TRADEMARK OFFICE
CERTIFICATE OF CORRECTION

| | | |
|---|---|---|
| PATENT NO. | : 12,082,002 B2 | Page 1 of 1 |
| APPLICATION NO. | : 14/789358 | |
| DATED | : September 3, 2024 | |
| INVENTOR(S) | : Smith et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 269 days.

Signed and Sealed this
Twelfth Day of August, 2025

Coke Morgan Stewart
*Acting Director of the United States Patent and Trademark Office*